US012223519B2

(12) United States Patent
Kondamudi et al.

(10) Patent No.: US 12,223,519 B2
(45) Date of Patent: *Feb. 11, 2025

(54) METHOD AND SYSTEM FOR GRANULAR-LEVEL SEGMENTATION OF USERS BASED ON ACTIVITIES ON WEBPAGES IN REAL-TIME

(71) Applicant: WizRocket Inc., Mountain View, CA (US)

(72) Inventors: Suresh Kondamudi, Mumbai (IN); Anand Jain, Mumbai (IN); Sunil Thomas, Los Altos, CA (US)

(73) Assignee: WizRocket Inc., Mountain View, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/304,530

(22) Filed: Jun. 22, 2021

(65) Prior Publication Data
US 2022/0405783 A1 Dec. 22, 2022

(51) Int. Cl.
*G06Q 30/02* (2023.01)
*G06N 20/00* (2019.01)
(Continued)

(52) U.S. Cl.
CPC ......... *G06Q 30/0204* (2013.01); *G06N 20/00* (2019.01); *G06Q 30/0254* (2013.01)

(58) Field of Classification Search
CPC . G06Q 30/0204; G06Q 30/0254; G06N 20/00
See application file for complete search history.

(56) References Cited

U.S. PATENT DOCUMENTS 5,649,068 A 7/1997 Boser et al.
8,417,715 B1 4/2013 Bruckhaus et al.
(Continued)

FOREIGN PATENT DOCUMENTS

WO 2015179083 A1 11/2015

OTHER PUBLICATIONS

CleverTap Developer Tool https://www.facebook.com/clevertap/videos/clevertap-developer-tutorial-ios-android-overview-of-behav/1602367513397173/ (Year: 2016).*
(Continued)

*Primary Examiner* — Breffni Baggot
(74) *Attorney, Agent, or Firm* — Kolisch Hartwell, P.C.

(57) ABSTRACT

The present disclosure provides a computer-implemented method and system for granular level segmentation of users based on online activities on a webpage in real-time. The computer-implemented method and system corresponds to a user segmentation system. The user segmentation system receives a first set of data associated with a plurality of users. The user segmentation system fetches a second set of data. The user segmentation system obtains a third set of data. The user segmentation system analyzes the first set of data, the second set of data and the third set of data using one or more machine learning algorithms. The user segmentation system creates one or more segments based on analysis performed on the first set of data, the second set of data and the third set of data. The user segmentation system initiates one or more marketing campaigns for the one or more segments.

13 Claims, 20 Drawing Sheets

(51) Int. Cl.
*G06Q 30/0204* (2023.01)
*G06Q 30/0251* (2023.01)

(56) References Cited

U.S. PATENT DOCUMENTS

| | | |
|---|---|---|
| 2003/0033194 A1 | 2/2003 | Ferguson et al. |
| 2007/0067211 A1 | 3/2007 | Kaplan et al. |
| 2011/0040636 A1 | 2/2011 | Simmons et al. |
| 2011/0131160 A1 | 6/2011 | Canny et al. |
| 2012/0226697 A1 | 9/2012 | Chang et al. |
| 2013/0326375 A1 | 12/2013 | Barak et al. |
| 2017/0177722 A1 | 6/2017 | Cavalin et al. |
| 2018/0129971 A1 | 5/2018 | Vlassis et al. |
| 2018/0174060 A1 | 6/2018 | Velez-Rojas et al. |
| 2021/0081759 A1 | 3/2021 | Zhao |
| 2021/0097384 A1 | 4/2021 | Jain et al. |
| 2021/0117862 A1 | 4/2021 | Sohum et al. |
| 2021/0142364 A1* | 5/2021 | Umeh ............... G06Q 30/0267 |
| 2021/0312288 A1 | 10/2021 | Wang et al. |
| 2022/0401696 A1 | 12/2022 | Kondamudi et al. |
| 2022/0405784 A1 | 12/2022 | Kondamudi et al. |
| 2022/0414696 A1 | 12/2022 | Kondamudi et al. |

OTHER PUBLICATIONS

CleverTap & Forrester https://www.facebook.com/100068567139184/videos/1602344400066151/?_so_=watchlist&_rv_=video_home_www_playlist_video_list (Year: 2016).*

Clevertap aka WizRocket 1 min product demo—YouTube https://www.youtube.com/watch?v=3NCeJkC06ZE (Year: 2014).*

University of Chicago, "Too Many Metrics: Measuring Social Media Impact" (Year: 2016).*

Martins, Daniel Jorge Ribeiro Nunes, "Data Extraction in E-Commerce" thesis, Universidade do Algarve Instituto Superior de Engenharia (UAlg ISE), 2016, 118 pgs.

* cited by examiner

400

Segments / Create New

Live user segment - Page visit  change segment type

When a user visits a page URL that [contains] ⌄ www.OTT1.com

☑ Filter on past user behavior and common properties

Users who did (applies)

| Contest Started ⌄ | First Time ⌄ | 📅 In the last 30 day(s) ⌄ |

+ Event

FIG. 4

1000
Select a channel for this campaign
Mobile channels
 Mobile Push    SMS    App Inbox
Email channels
 Email
Desktop / Mobile web channels
 Web Push
Scoial channels
 WhatsApp
Remarketing channels
 Audiences    Google Ads
Server channels
 Webhooks
FIG. 10

1100

| Engage / Mobile Push / Untitled ✎ |
| --- |
| Channel > Type > When > Who > What > Setup > Overview |

Message type
- ● One time   ○ Multiple dates   ○ Recurring

Campaign start date and time
- ● Now   ○ Later

☑ Advanced (Set Campaign Do Not Disturb hours, Cut-off time and Deliver in User Time zone options, Throttling)

Time zone ⓘ

☑ Deliver in Users time zone

If the campaign start time is after a user's local time, then
- ● Drop the campaign
- ○ Deliver the campaigns the next day

Campaign Do Not Disturb (DND) ⓘ

☑ Do not deliver messeges for this campaign between

| 10 | : | 00 | PM ⌄ | to | 06 | : | 00 | AM ⌄ |

- ● Discard messages scheduled during DND hours
- ○ Delay delivery until the end of DND hours

Restrict delivery to

OS
☑ iOS  ☑ Android

Device
☑ Mobile  ☑ Tablet  ☑ TV

Campaign reach

Current segment size                              Calculate

Total : 3,046
Android : 1,082
iOS : 1,964

This segment size may vary at the time of campaign run.

Send the campaign to
◉ All the users who qualify at the time of campaing run
  🛡 Safety check
  ☐ Don't send campaign if the segment size exceeds
     [          ] users

- The actual reach of the campaign will not be exactly same as the segment size at the time of campaign run due to frequency caps.
- The safety check ensures that if the segment size exceeds beyond a said number, the campaign won't run at all. In this case, an email alert will be sent to campaign creator and all admins.

FIG. 12

Channel > Type > When > Who > What > Setup > Overview

Control groups

Custom/Campaign contol groups ⓘ

Apply [Custom Control Group ▾] [Christmas Campaigns ▾] Remove for the campaign

System contol groups ⓘ

System contol group (5%) is applied for this campaign

Android push message time to live ⓘ

[12] [Hour(s) ▾]
Max Hours - 24  Max days - 28

Add labels ⓘ

Enable post action webhook ⓘ

Setup conversion tracking ⓘ

Channel > Type > When > Who > What > Setup > Overview

✓ WHEN
Campaign start date : Start now
Campaign end date and time : Until stopped
Delay : No delay Campaign DND Settings : Not Set

✓ WHO

Trigger
   When a user DOES
   Added to watch later
Filtered by
   No filters applied Campaign reach : Send campaign to all users who qualify.
Send to : Mobile, Tablet, TV ✓ WHAT
Campaign type : Single message
iOS                                   Android ☐ Demo OTT                           CHRISTMAS FESTIVE SALE
CHRISTMAS FESTIVE SALE               Apple Smartwatch at just $
Apple Smartwatch at just $           1,499
1,499

✓ SETUP
Custom Control Group : Christmas Campaigns 5%
System Control Group : 5%

FIG. 17

METHOD AND SYSTEM FOR GRANULAR-LEVEL SEGMENTATION OF USERS BASED ON ACTIVITIES ON WEBPAGES IN REAL-TIME

TECHNICAL FIELD

The present invention relates to the field of marketing and, in particular, relates to a method and system for granular-level segmentation of users based on activities on webpages in real-time.

INTRODUCTION

Over the past few years, online platforms have become a popular way for individuals and consumers to interact online. The online platforms have been used to provide range of services to the individuals on the Internet. The range of services are such as marketplaces, search engines, social media, consumer business, financial services, industrial products, home services, legal services, creative services, e-learning services, and the like. In addition, the online platforms facilitate interactions between at least two or more distinct individuals (whether firms or consumers) through the range of services via the Internet. We have seen an increasing demand in the usage of the online platforms. The increasing demand of the online platforms leads to a competitive environment within online platform providers. The online platform providers have to make segments for the individuals accessing the online platforms for running marketing campaigns in this competitive environment. The online platform providers are seeking effective ways to run the marketing campaigns. In addition, the online platform providers seek to have a high successful rate of the marketing campaigns for the segments. However, the present systems and methods for the segmentation of the individuals accessing the online platforms is not at granular level. In addition, the present systems and methods do not allow the online platform providers to customize the marketing campaigns according to the granularity of the segments of the individuals. Further, the present systems and methods do not allow the online platform providers to measure the effectiveness of the marketing campaigns for the segments in real-time. Furthermore, the present systems and methods do not allow the online platform providers to analyze the performance of the marketing campaigns for segments in real-time.

In light of the above stated discussion, there is a need for a method and system which overcomes the above stated disadvantages.

SUMMARY

In a first example, a computer-implemented method is provided. The computer-implemented method for granular-level segmentation of users based on activities on webpages in real-time. The computer implemented method corresponds to a user segmentation system with a processor. The computer-implemented method includes a first step to receive a first set of data associated with a plurality of users. In addition, the computer-implemented method includes a second step to fetch a second set of data associated with a plurality of past events of the plurality of users on a plurality of webpages of one or more online platforms through one or more communication devices. Further, the computer-implemented method includes a third step to obtain a third set of data associated with a plurality of live events of the plurality of users on the plurality of webpages of the one or more online platforms through the one or more communication devices. Furthermore, the computer-implemented method includes a fourth step to analyze the first set of data, the second set of data and the third set of data using one or more machine learning algorithms. Moreover, the computer-implemented method includes a fifth step to create one or more segments of the plurality of users based on analysis performed on the first set of data, the second set of data and the third set of data using a plurality of filters. Also, the computer-implemented method includes a sixth step to trigger initialization of one or more marketing campaigns for the one or more segments. The plurality of users is associated with the one or more communication devices. The first set of data is received in real-time. The third set of data is obtained in real time. The analysis is performed based on training of a machine learning model. The analysis is performed to identify one or more patterns. The analysis is performed in real-time. The plurality of filters is based on one or more parameters. The one or more segments are created in real-time. The one or more marketing campaigns are initiated based on the one or more patterns of the one or more segments using the plurality of filters. The one or more marketing campaigns are initiated in real-time.

In an embodiment of the present disclosure, the first set of data corresponds to personal information of the plurality of users. The first set of data includes name data, age data, e-mail identity data, contact number data, gender data, geographic location data, angiographic data, and demographic data. In addition, the first set of data includes payment cards data, banking partners data, and relationship status data. The first set of data is received from one or more online platform database, one or more communication device database, and third party database.

In an embodiment of the present disclosure, the second set of data corresponds to the plurality of past events of the plurality of users. The plurality of past events includes past uniform resource locater visits, past number of visits, past number of pages accessed, past webpage visited, past accessed content, past started content, and past paused content. In addition, the plurality of past events includes past resumed content, past searched content, past notification clicks, past notification views, past products surfed, past products added to cart, and past reviews for products. Further, the plurality of past events includes past favorite product category, past inactivity for products, past accounts opened, past credit card requests, past credit cards issued, and past loan requests. Furthermore, the plurality of past events includes past net-banking requests, past multimedia content surfed, past multimedia content watched, past texts exchanged, past business blogs, and past live media streamed. Moreover, the plurality of past events includes past audio-video callings, past medicines searched, past medicines bought, past medical test kit bought, past medical tests scheduled, and past bill payments. Also, the plurality of past events includes past doctor consultation scheduled, past hospital visit planned, past dietary plan requested, past personal trainer hired, and past fitness center searched. Also, the plurality of past events includes past educational video searched, past educational video watched, past projects submitted, past mock tests subscribed, and past educational counselling requested. Also, the plurality of past events includes past problem solving session requested, past international masters interests, past properties searched, past properties watched, and past properties bought. Also, the plurality of past events includes past rented properties searched, past maintenance services requested, past hotel searched, past hotels added to watch-list, past hotel bookings, and past holiday plans searched. Also, the plurality of past events includes past holiday plans booked, past stock exchange investments, past money donated, past inactivity for product category, and past account created. Also, the plurality of past events includes past products bought, past repeated products, past subscriptions, past subscription renewals, past subscription skipped, and past initiated transactions. Also, the plurality of past events includes past failed transactions, past content added to cart, past completed transactions, and past most visited category. Also, the plurality of past events includes past content details watched, past video on demand accessed, past video on demand initiated, and past video on demand searched.

In an embodiment of the present disclosure, the third set of data corresponds the plurality of live events of the plurality of users. The plurality of live events includes real-time uniform resource locater visits, real-time number of webpage visits, real-time number of webpages accessed, real-time webpage visit, and real-time accessed content. In addition, the plurality of live events includes real-time started content, real-time paused content, real-time resumed content, real-time searched content, real-time notification clicks, and real-time notification views. Further, the plurality of live events includes real-time products surfed, real-time products added to cart, real-time reviews for products, real-time favorite product category, and real-time inactivity for products. Furthermore, the plurality of live events includes real-time accounts opened, real-time credit card requests, real-time credit cards issued, real-time loan requests, and real-time net-banking requests. Moreover, the plurality of live events includes real-time multimedia content surfed, real-time multimedia content watched, real-time texts exchanged, real-time business blogs, and real-time live media streamed. Also, the plurality of live events includes real-time audio-video callings, real-time medicines searched, real-time medicines bought, real-time medical test kit bought, and real-time medical tests scheduled. Also, the plurality of live events includes real-time bill payments, real-time doctor consultation scheduled, real-time hospital visit planned, real-time dietary plan requested, and real-time personal trainer hired. Also, the plurality of live events includes real-time fitness center searched, real-time educational video searched, real-time educational video watched, real-time projects submitted, and real-time mock tests subscribed. Also, the plurality of live events includes real-time educational counselling requested, real-time problem solving session requested, real-time international masters interests, and real-time properties searched. Also, the plurality of live events includes real-time properties watched, real-time properties bought, real-time rented properties searched, real-time maintenance services requested, and real-time hotel searched. Also, the plurality of live events includes real-time hotels added to watch-list, real-time hotel bookings, real-time holiday plans searched, real-time holiday plans booked, and real-time stock exchange investments. Also, the plurality of live events includes real-time money donated, real-time inactivity for product category, real-time account created, real-time products bought, and real-time repeated products. Also, the plurality of live events includes real-time subscriptions, real-time subscription renewals, real-time subscription skipped, and real-time initiated transactions. Also, the plurality of live events includes real-time failed transactions, real-time content added to cart, real-time completed transactions, real-time most visited category, and real-time content details watched. Also, the plurality of live events includes real-time video on demand accessed, real-time video on demand initiated, and real-time video on demand searched.

In an embodiment of the present disclosure, the one or more online platforms include an over-the top media platform, an e-commerce platform, a fintech platform, and a social media platform. In addition, the one or more online platforms include a health platform, an educational platform, a real estate and housing platform, and a travel platform.

In an embodiment of the present disclosure, the computer-implemented method further creates the machine learning model to perform analysis of the first set of data, the second set of data, and the third set of data at the user segmentation system with the processor. The machine learning model is trained to identify the one or more patterns from the first set of data, the second set of data, and the third set of data.

In an embodiment of the present disclosure, the one or more patterns include uniform resource locater visit pattern, webpage visit pattern, number of webpage accessed pattern, and accessed content pattern. In addition, the one or more patterns include started content pattern, paused content pattern, resumed content pattern, searched content pattern, notification click pattern, and notification views pattern. Further, the one or more patterns include products surfed pattern, products added to cart pattern, reviews for products pattern, favorite product category pattern, inactivity for products pattern, and accounts opened pattern. Furthermore, the one or more patterns include credit card requests pattern, credit cards issued pattern, loan request patterns, net-banking requests pattern, and multimedia content surfed pattern. Moreover, the one or more patterns include multimedia content watched pattern, texts exchanged pattern, business blogs pattern, live media streamed pattern, and audio-video calling pattern. Also, the one or more patterns include medicines searched pattern, medicines bought pattern, medical test kit bought pattern, medical tests scheduled pattern, bill payments pattern, and doctor consultation scheduled pattern. Also, the one or more patterns include hospital visit pattern, dietary plan request pattern, personal trainer hired pattern, fitness center search pattern, and educational video search pattern. Also, the one or more patterns include educational video watched pattern, projects submission pattern, mock tests subscription pattern, and educational counselling request pattern. Also, the one or more patterns include problem solving session request pattern, international masters interest pattern, properties search pattern, and properties watched pattern. Also, the one or more properties bought pattern, rented properties search pattern, maintenance services request pattern, hotel search pattern, hotels added to watch-list pattern, and hotel bookings pattern. Also, the one or more patterns include holiday plans search pattern, holiday plans booked pattern, stock exchange investments pattern, money donated pattern, and inactivity for product category pattern. Also, the one or more patterns include account creation pattern, products bought pattern, repeated products pattern, subscriptions pattern, subscription renewals pattern, and subscription skipped pattern. Also, the one or more patterns include initiated transactions pattern, failed transactions pattern, content added to cart pattern, completed transactions pattern, and most visited category pattern. Also, the one or more patterns include content details watched pattern, video on demand accessed pattern, video on demand initiated pattern, and video on demand searched pattern.

In an embodiment of the present disclosure, the plurality of filters includes time based filters, days based filters, age based filters, location based filters, events based filters, inactivity based filters, and user properties filters. In addition, the plurality of filters includes demographic filters, geographic filters, technographic filters, and application field filters. The one or more parameters include day, time, language, location, events, inactivity, and online platform.

In an embodiment of the present disclosure, the computer-implemented method further creates a segment plot for each of the one or more segments at the user segmentation system with the processor. The segment plot is in one or more forms. The one or more forms include bar graph, histogram, pictogram, pie graph, line graph, and Cartesian graph. The segment plot is downloaded in one or more formats. The one or more formats include chart, joint photographic experts group, potable network graphics, portable document format, scalable vector graphics, and comma-separated values.

In an embodiment of the present disclosure, the computer-implemented method further displays one or more advertisements associated with the one or more marketing campaigns for the one or more segments at the user segmentation system with the processor. The one or more advertisements are displayed to each of the plurality of users on the one or more communication devices based on the one or more patterns. The one or more advertisements are displayed in the real-time on the one or more communication devices.

In a second example, a computer system is provided. The computer system includes one or more processors, a signal generator circuitry embedded inside a computing device for generating a signal, and a memory. The memory is coupled to the one or more processors. The memory stores instructions. The instructions are executed by the one or more processors. The execution of the instructions causes the one or more processors to perform a method for granular-level segmentation of users based on activities on webpages in real-time. The method corresponds to a user segmentation system. The method includes a first step to receive a first set of data associated with a plurality of users. In addition, the method includes a second step to fetch a second set of data associated with a plurality of past events of the plurality of users on a plurality of webpages of one or more online platforms through one or more communication devices. Further, the method includes a third step to obtain a third set of data associated with a plurality of live events of the plurality of users on the plurality of webpages of the one or more online platforms through the one or more communication devices. Furthermore, the method includes a fourth step to analyze the first set of data, the second set of data and the third set of data using one or more machine learning algorithms. Moreover, the method includes a fifth step to create one or more segments of the plurality of users based on analysis performed on the first set of data, the second set of data and the third set of data using a plurality of filters. Also, the method includes a sixth step to trigger initialization of one or more marketing campaigns for the one or more segments. The plurality of users is associated with the one or more communication devices. The first set of data is received in real-time. The third set of data is obtained in real time. The analysis is performed based on training of a machine learning model. The analysis is performed to identify one or more patterns. The analysis is performed in real-time. The plurality of filters is based on one or more parameters. The one or more segments are created in real-time. The one or more marketing campaigns are initiated based on the one or more patterns of the one or more segments using the plurality of filters. The one or more marketing campaigns are initiated in real-time.

In a third example, a non-transitory computer-readable storage medium is provided. The non-transitory computer-readable storage medium encodes computer executable instructions that, when executed by at least one processor, performs for granular-level segmentation of users based on activities on webpages in real-time. The method corresponds to a user segmentation system. The method includes a first step to receive a first set of data associated with a plurality of users. In addition, the method includes a second step to fetch a second set of data associated with a plurality of past events of the plurality of users on a plurality of webpages of one or more online platforms through one or more communication devices. Further, the method includes a third step to obtain a third set of data associated with a plurality of live events of the plurality of users on the plurality of webpages of the one or more online platforms through the one or more communication devices. Furthermore, the method includes a fourth step to analyze the first set of data, the second set of data and the third set of data using one or more machine learning algorithms. Moreover, the method includes a fifth step to create one or more segments of the plurality of users based on analysis performed on the first set of data, the second set of data and the third set of data using a plurality of filters. Also, the method includes a sixth step to trigger initialization of one or more marketing campaigns for the one or more segments. The plurality of users is associated with the one or more communication devices. The first set of data is received in real-time. The third set of data is obtained in real time. The analysis is performed based on training of a machine learning model. The analysis is performed to identify one or more patterns. The analysis is performed in real-time. The plurality of filters is based on one or more parameters. The one or more segments are created in real-time. The one or more marketing campaigns are initiated based on the one or more patterns of the one or more segments using the plurality of filters. The one or more marketing campaigns are initiated in real-time.

BRIEF DESCRIPTION OF THE DRAWINGS

Figure 1:
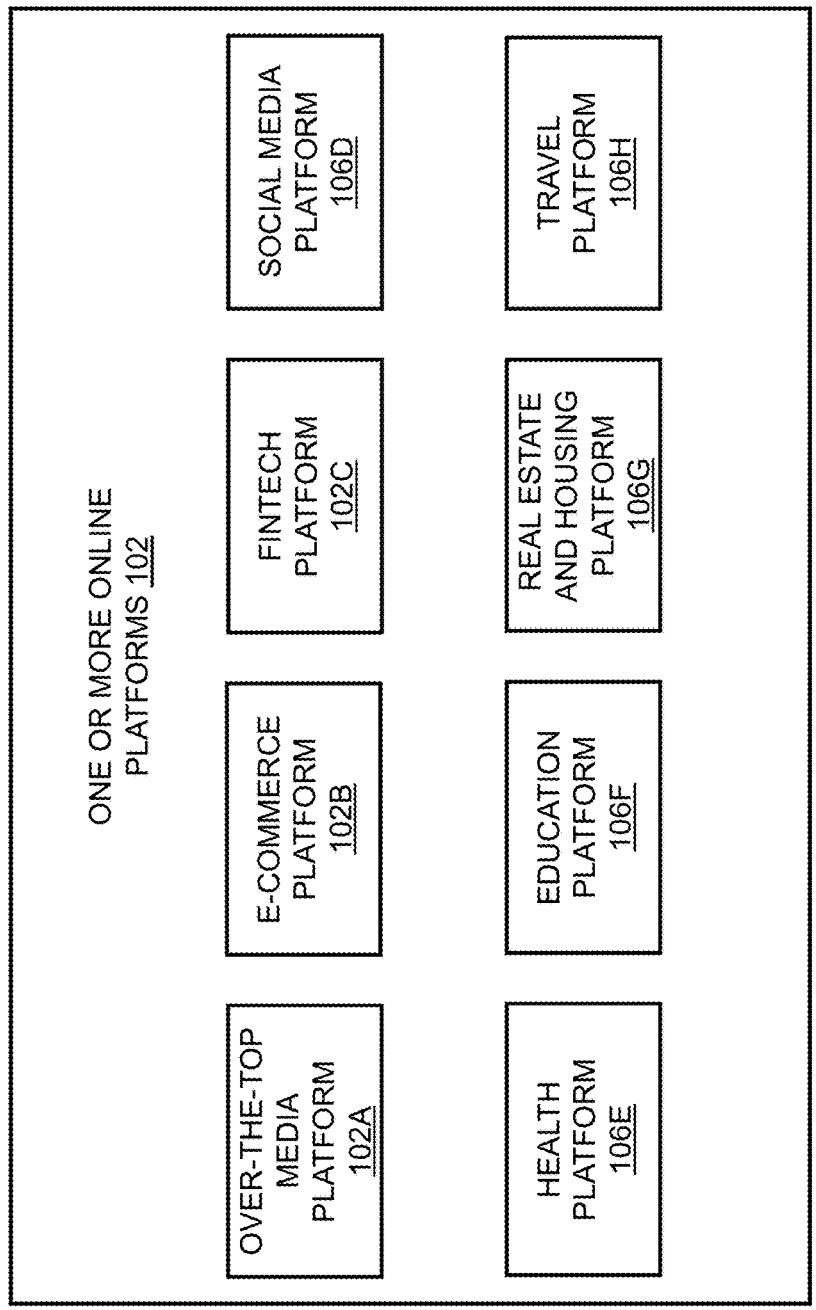
Figure 2:
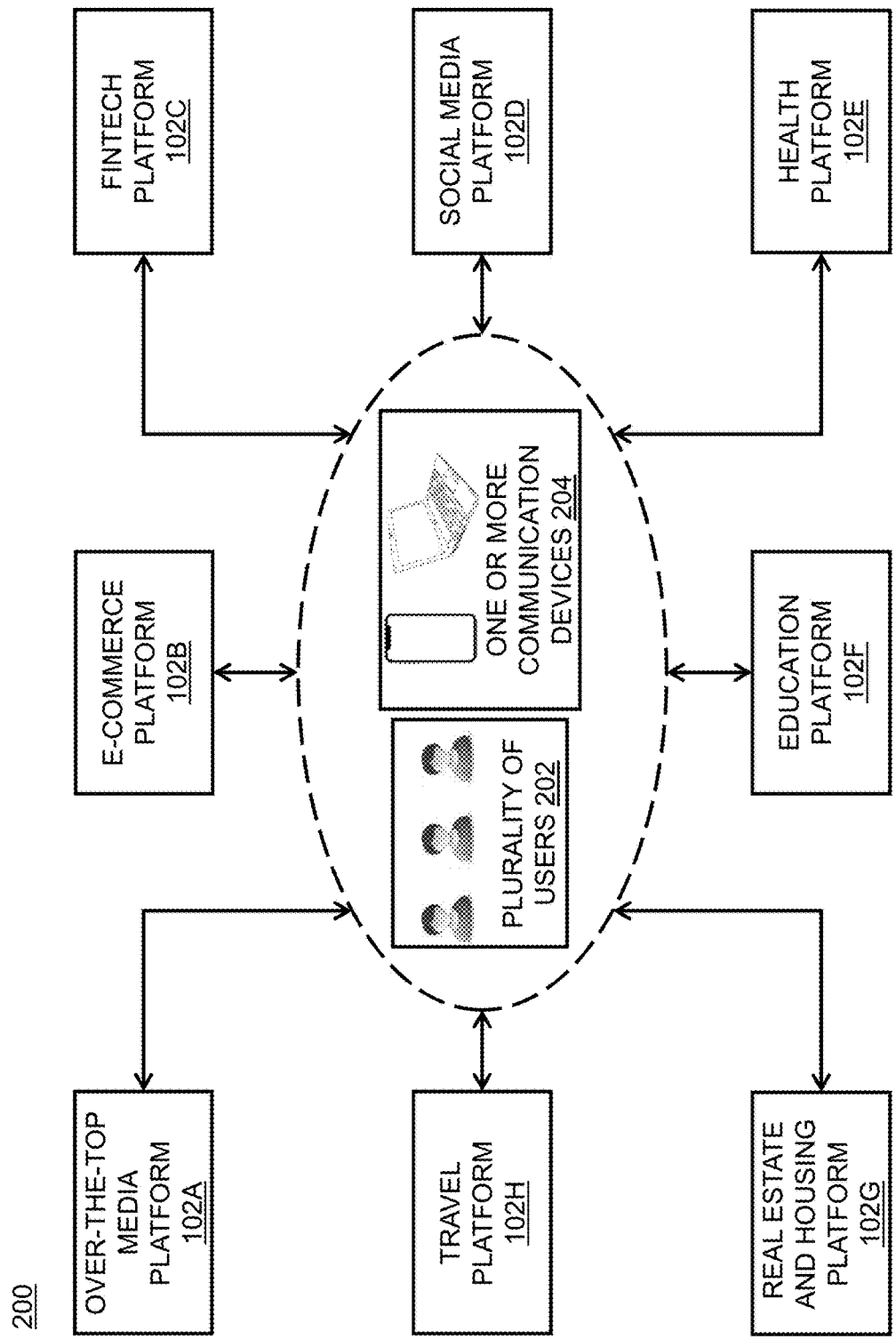
Figure 3:
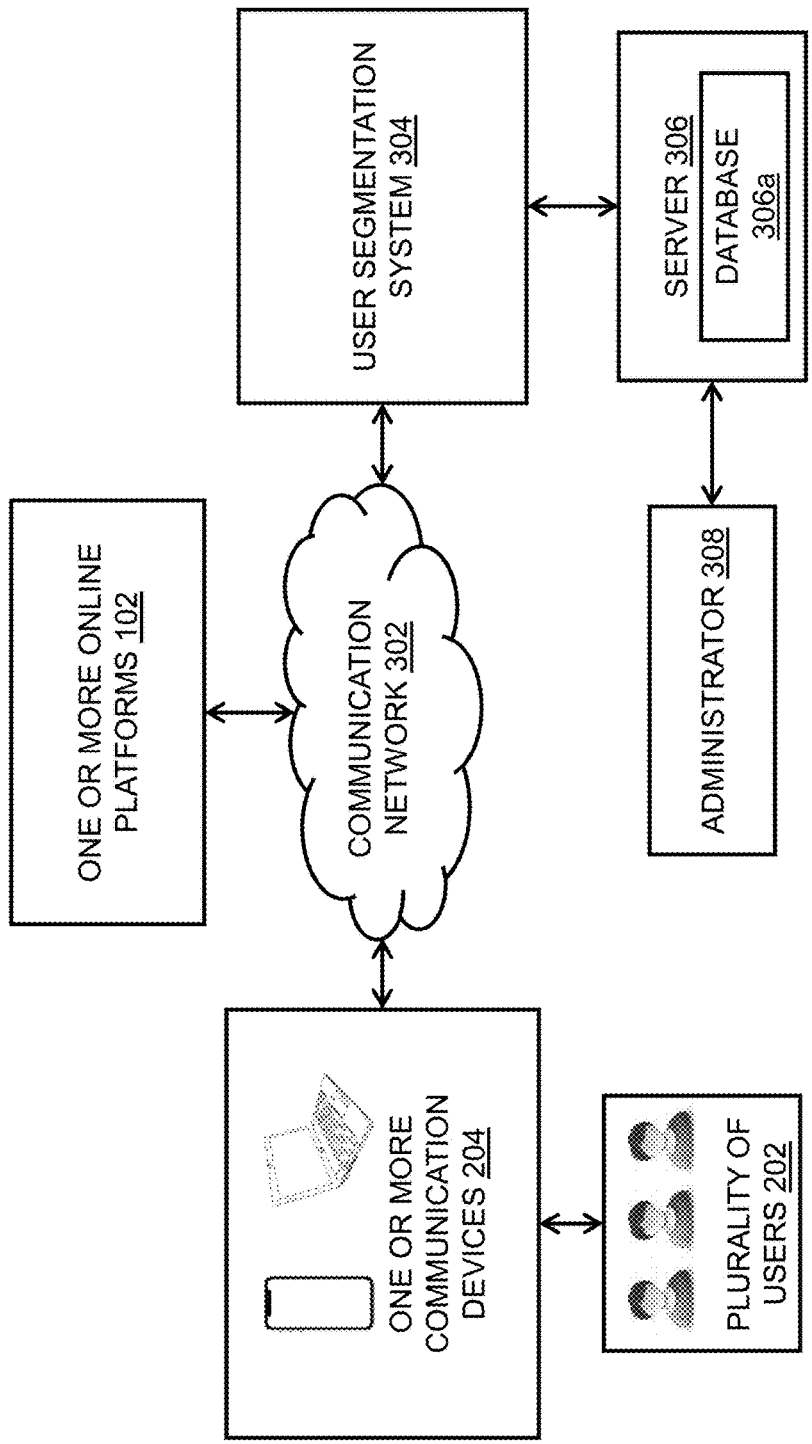
Figure 5:
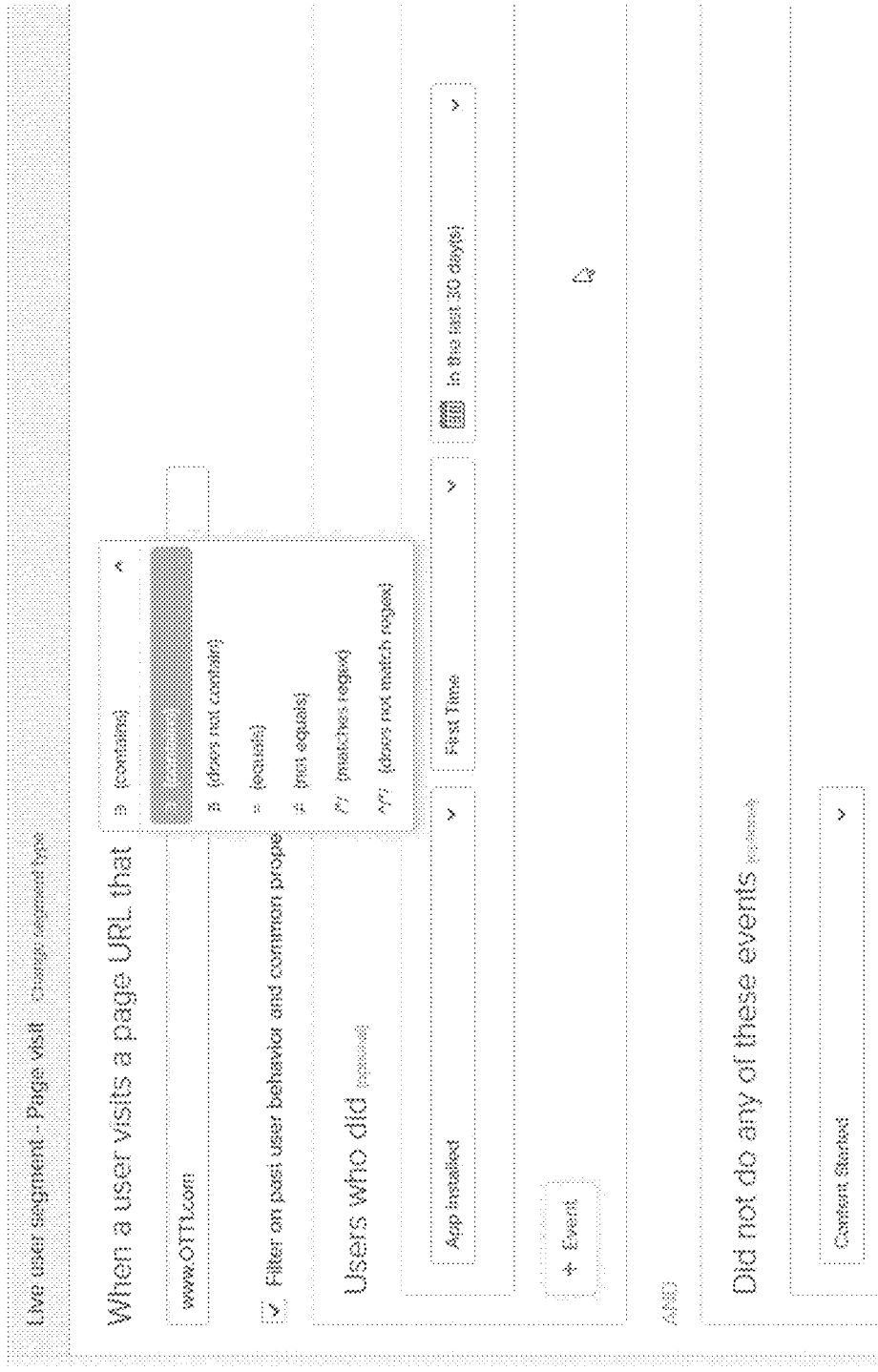
Figure 6:
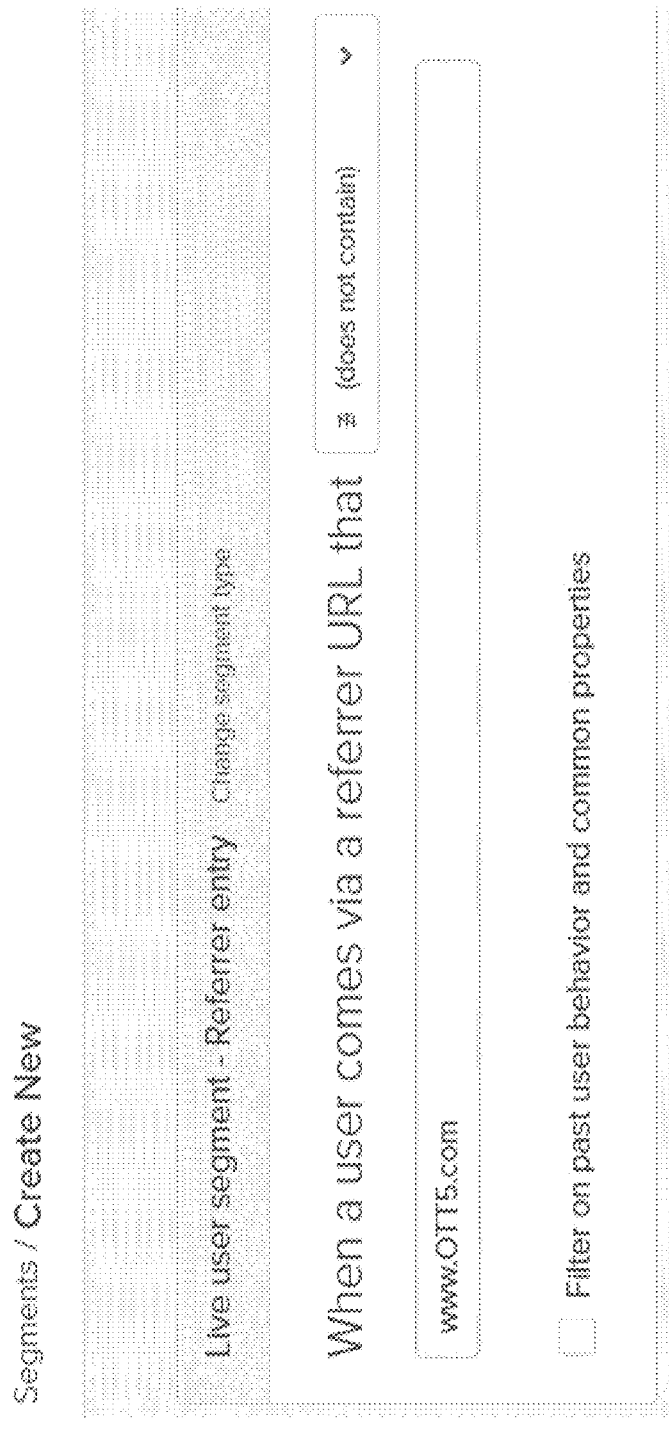
Figure 7:
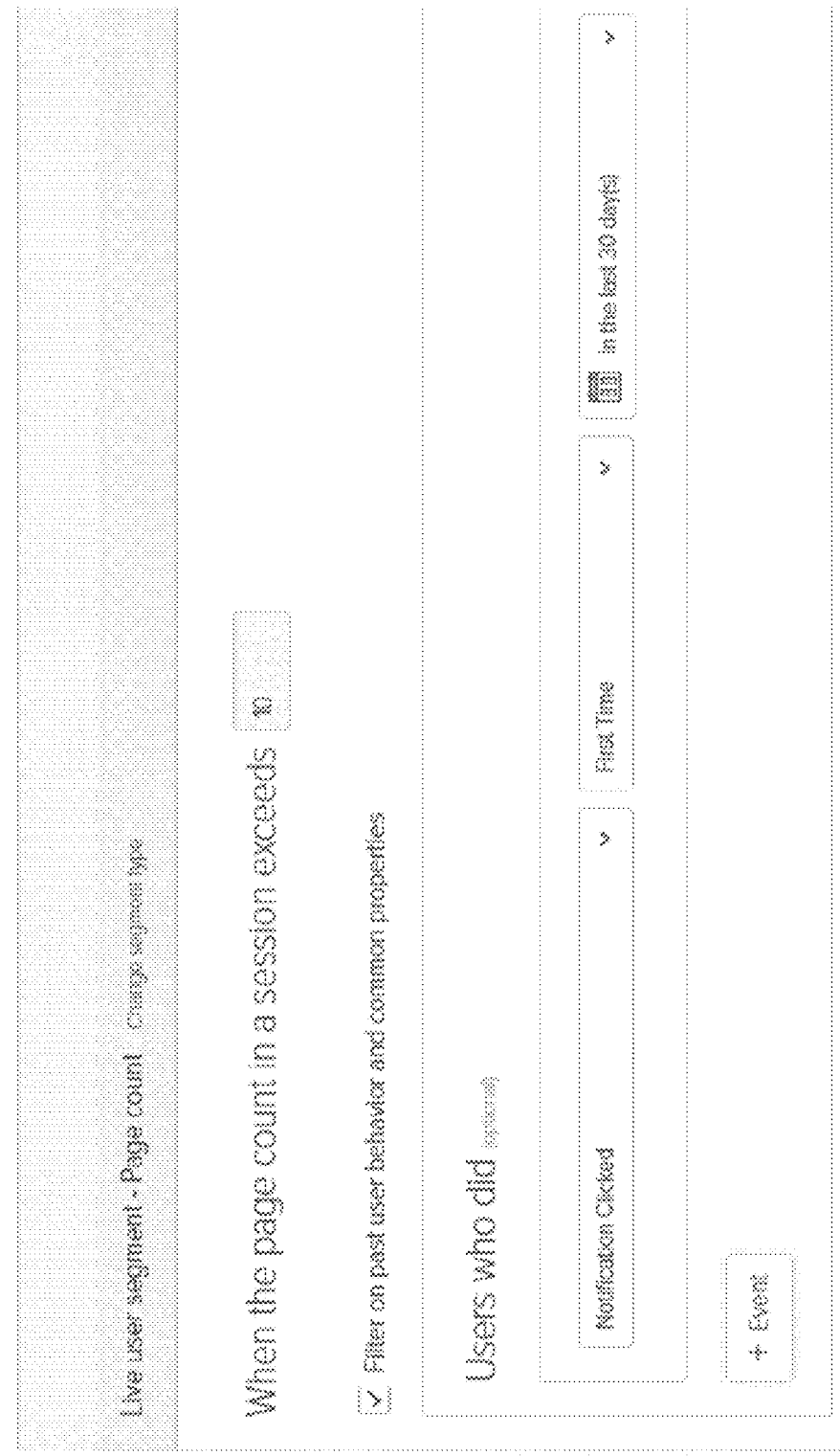
Figure 8:
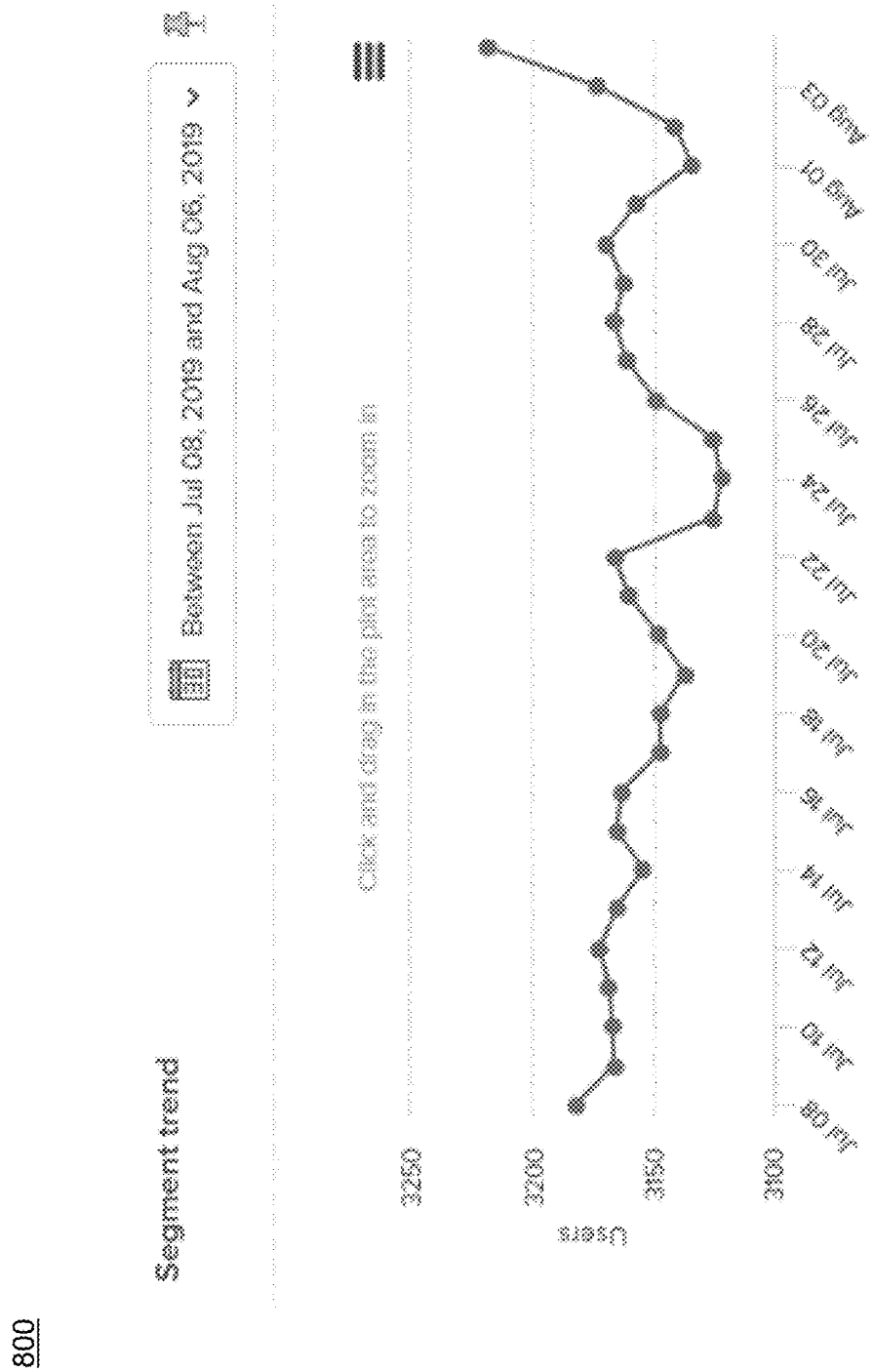
Figure 9:
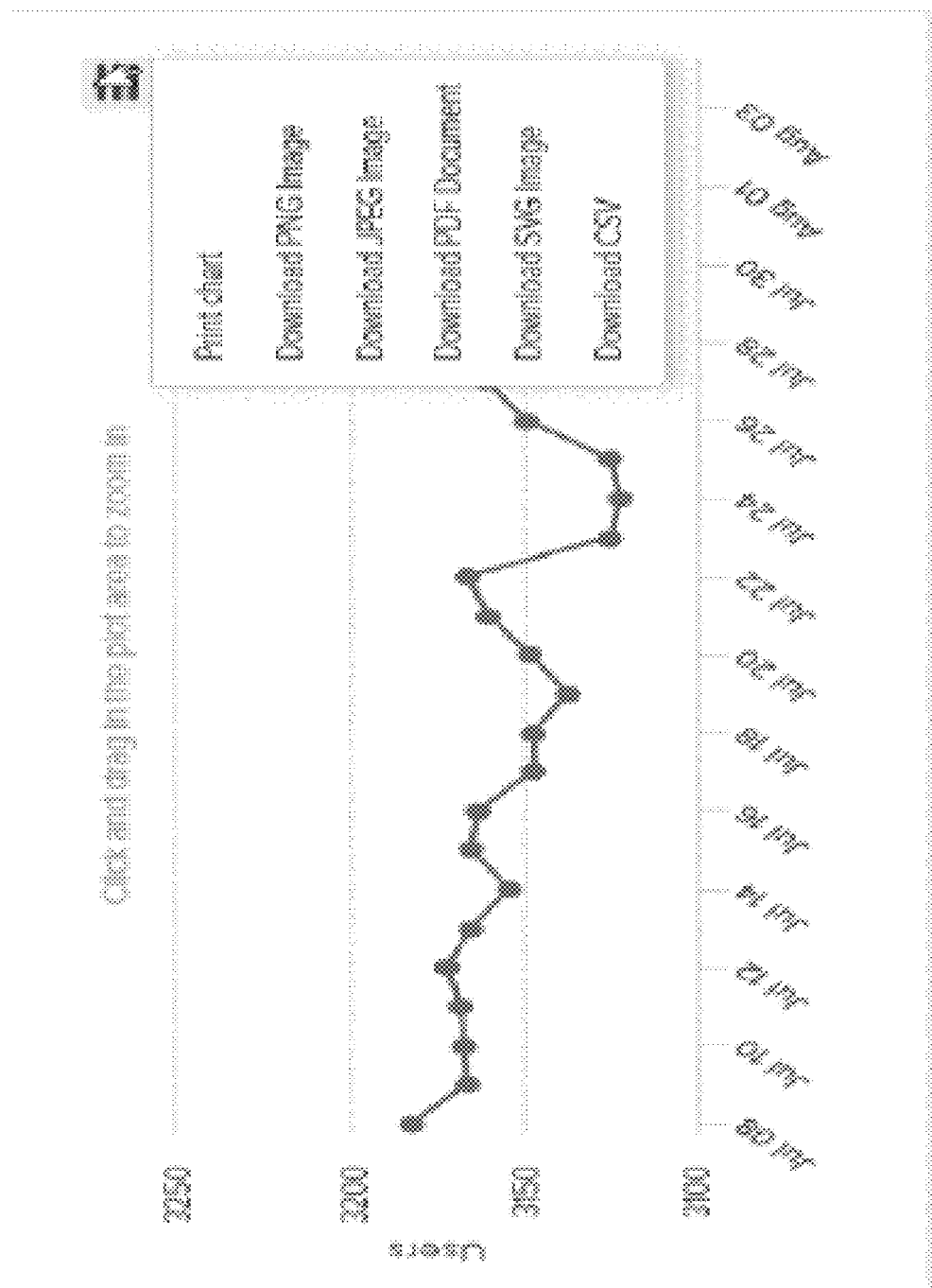
Figure 13:
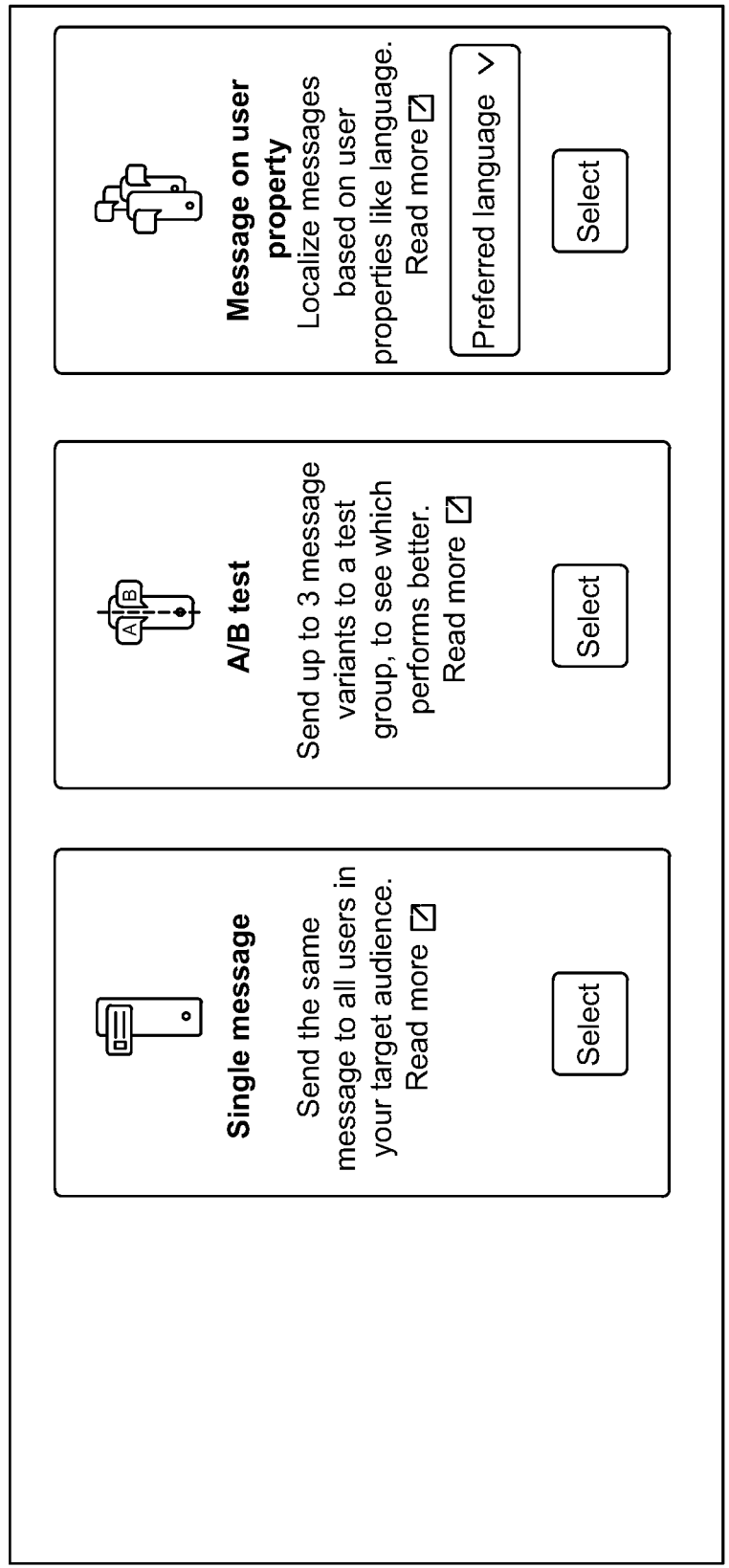
Figure 14:
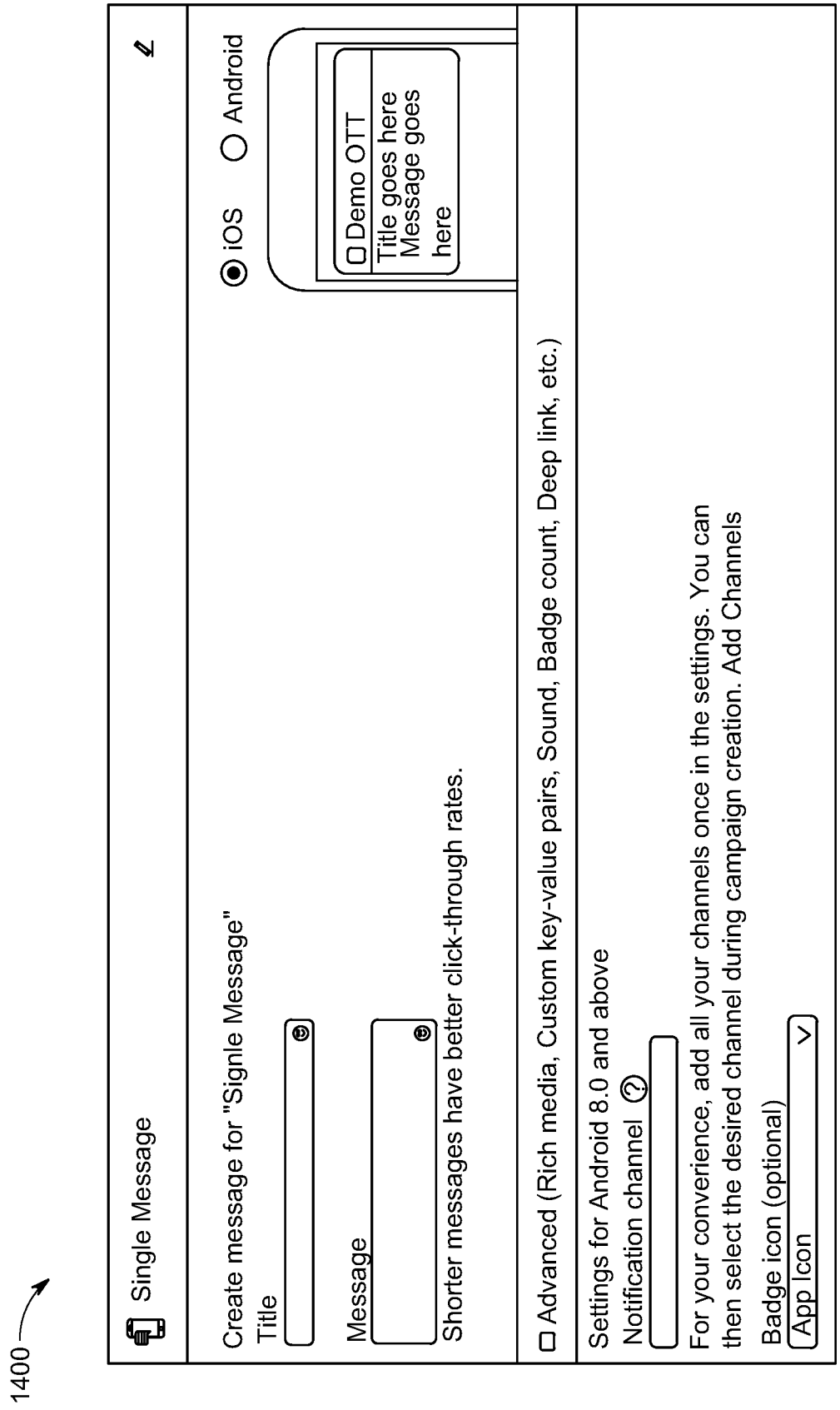
Figure 15:
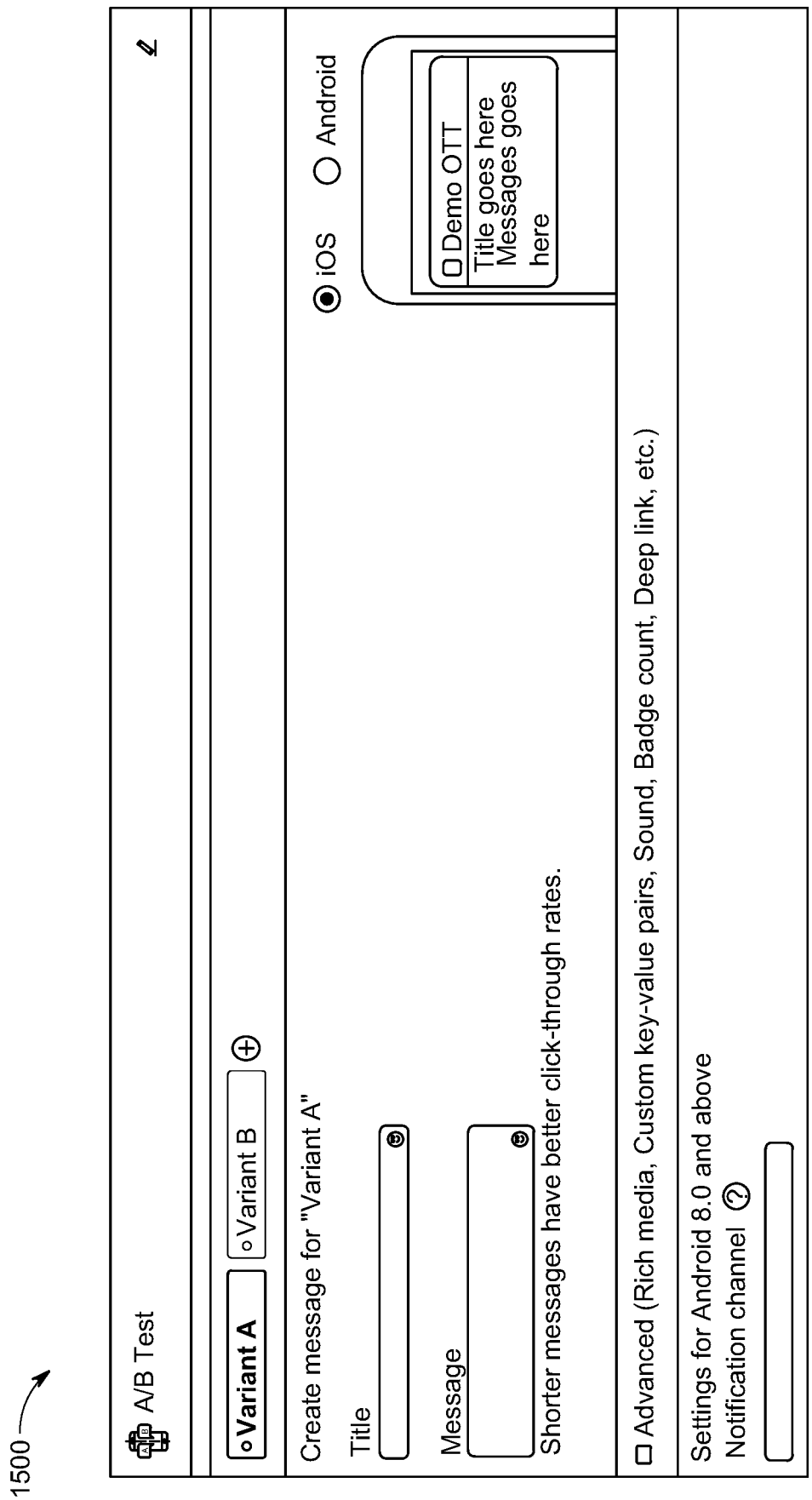
Figure 18A:
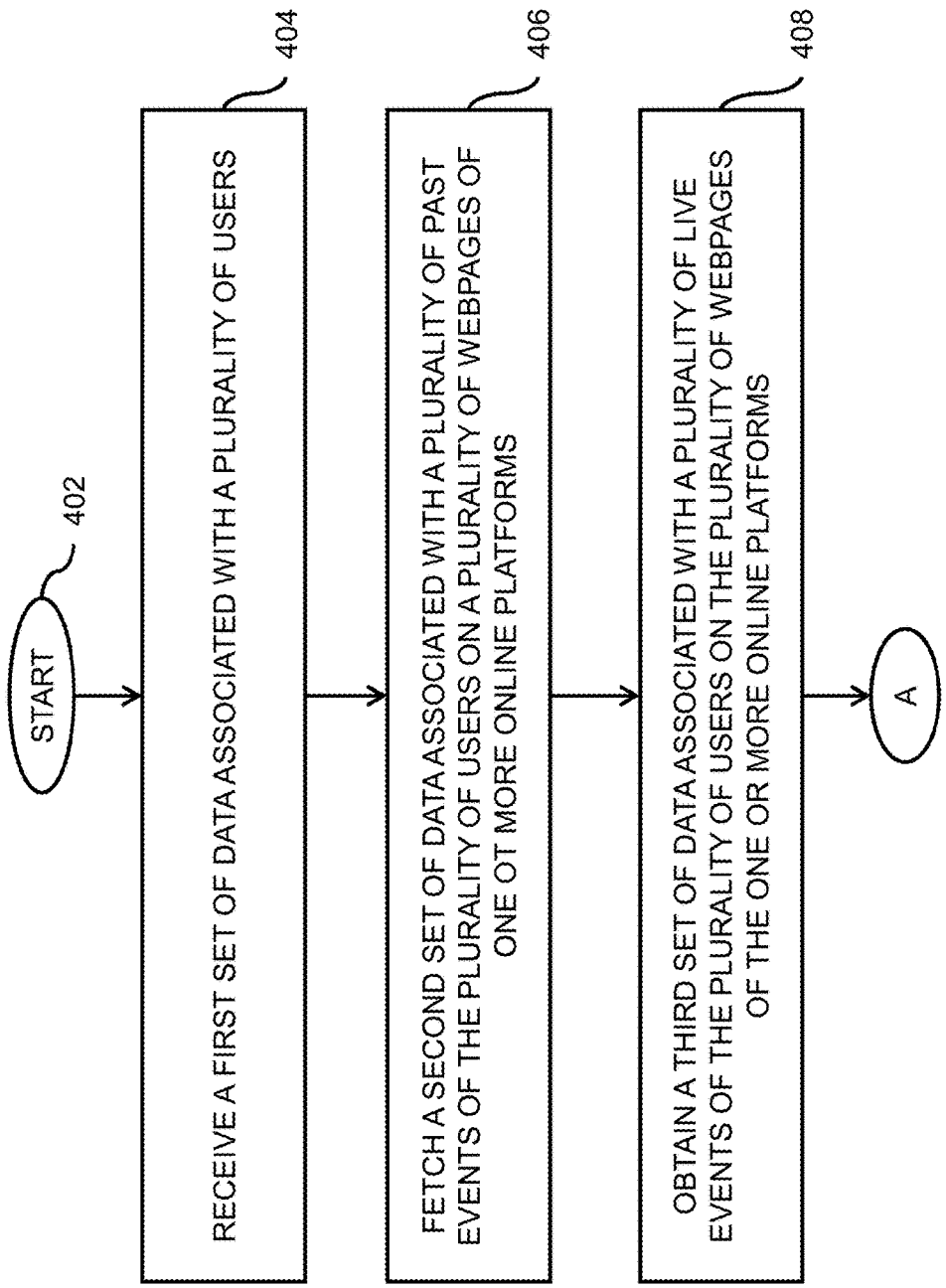
Figure 18B:
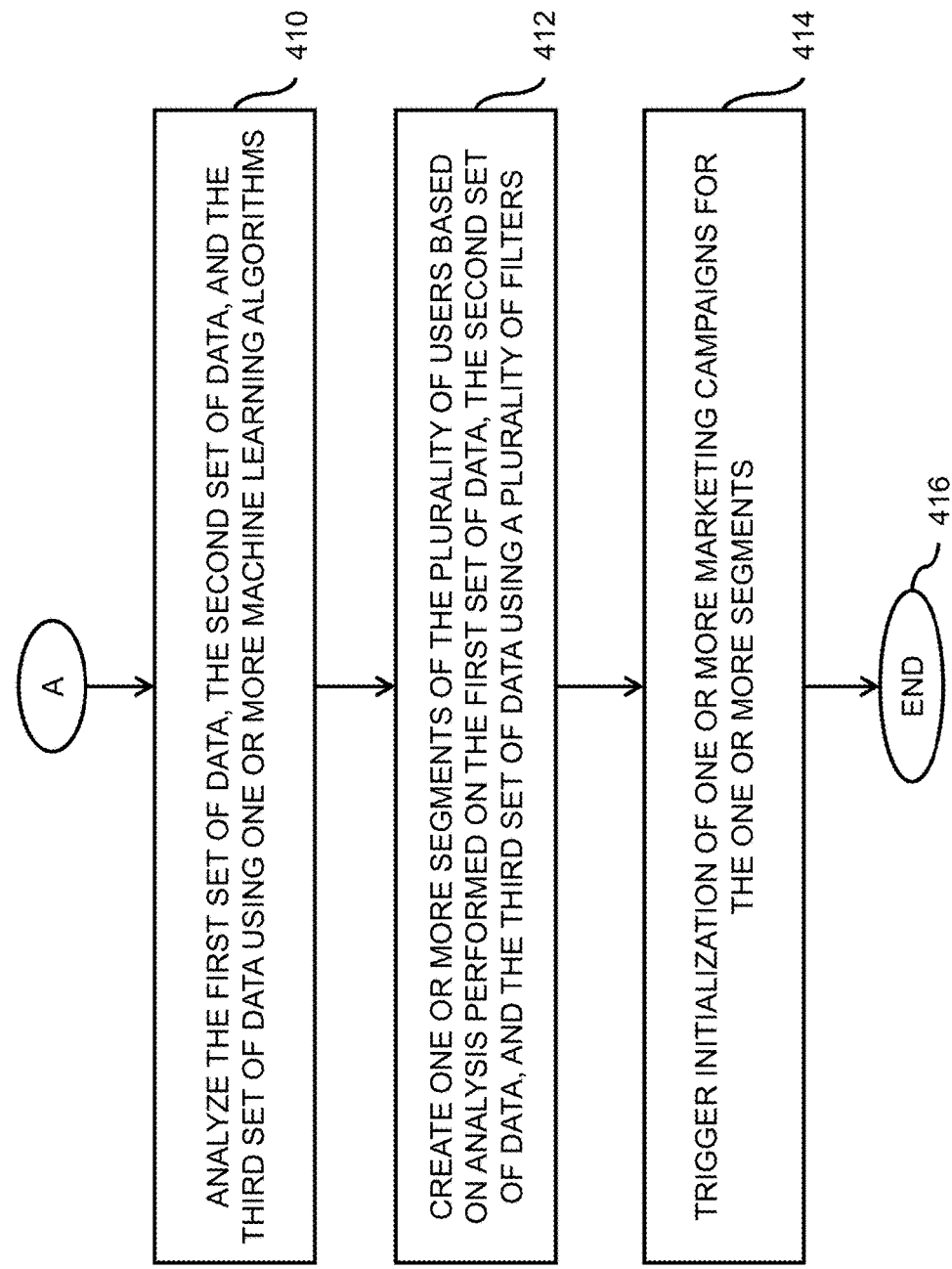
Figure 19:
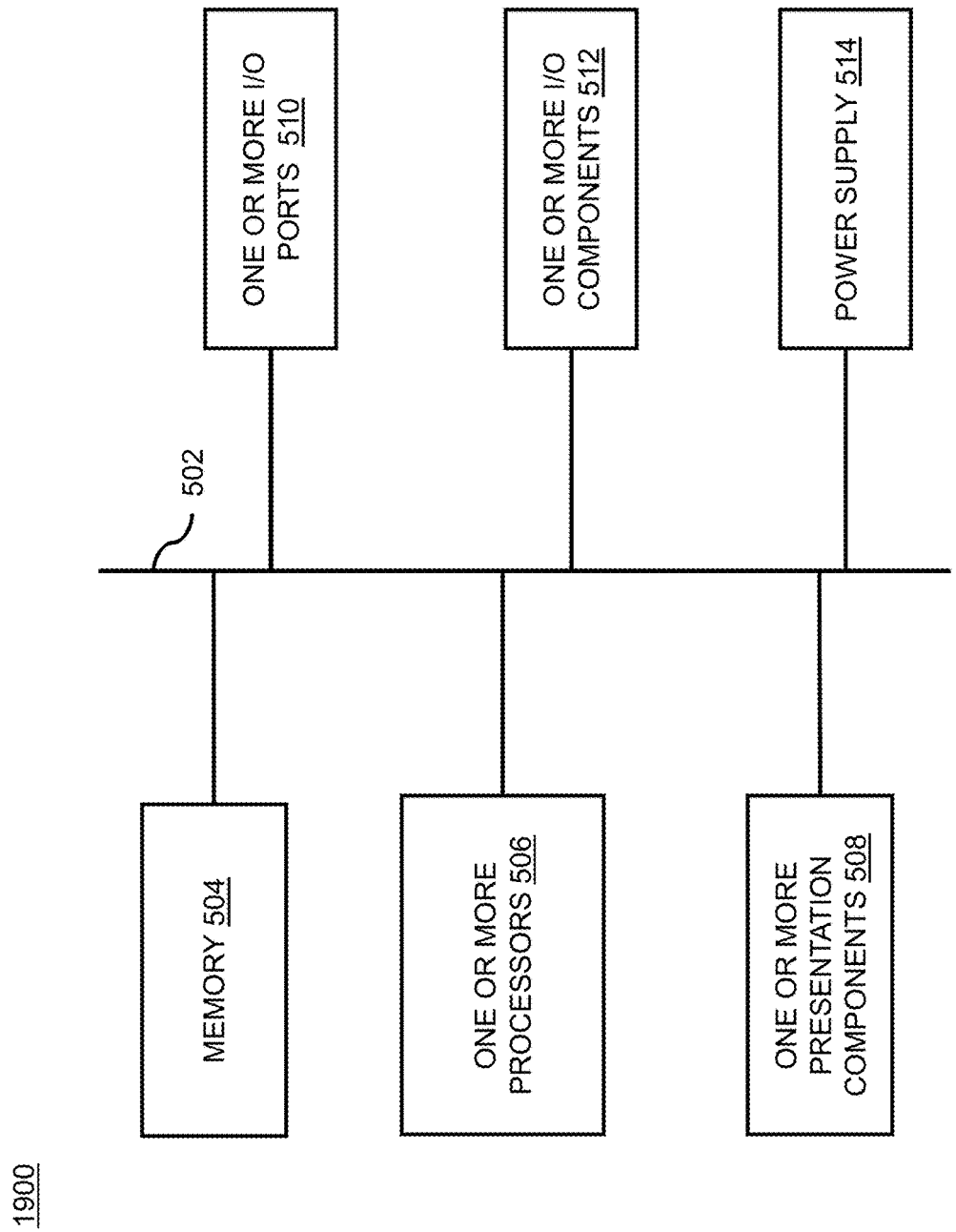

Having thus described the invention in general terms, reference will now be made to the accompanying drawings, which are not necessarily drawn to scale, and wherein:

FIG. 1 illustrates a block diagram of one or more online platforms, in accordance with various embodiments of the present disclosure;

FIG. 2 illustrates a general overview of an interactive system enabling interaction of a plurality of users on the one or more online platforms in real-time, in accordance with various embodiments of the present disclosure;

FIG. 3 illustrates an interactive computing environment for segmentation of the plurality of users in real-time, in accordance with various embodiments of the present disclosure;

FIG. 4 illustrates an example of segmentation of the plurality of users for a "page visit" sub-category in real-time, in accordance with various embodiments of the present disclosure;

FIG. 5 illustrates an example of a plurality of uniform resource locator filters for the "page visit" sub-category for segmentation of the plurality of users in real-time, in accordance with various embodiments of the present disclosure;

FIG. 6 illustrates an example of segmentation of the plurality of users for a "referrer entry" sub-category in real-time, in accordance with various embodiments of the present disclosure;

FIG. 7 illustrates an example of segmentation of the plurality of users for a "page count" sub-category in real-time, in accordance with various embodiments of the present disclosure;

FIG. 8 illustrates an example of a "segment trend plot", in accordance with various embodiments of the present disclosure;

FIG. 9 illustrates an example for downloading the "segment trend plot" in one or more formats, in accordance with various embodiments of the present disclosure;

FIG. 10 illustrates an example for selecting a plurality of channels for initiating a marketing campaign, in accordance with various embodiments of the present disclosure;

FIG. 11 illustrates an example for engaging the marketing campaign using a "mobile push" channel, in accordance with various embodiments of the present disclosure;

FIG. 12 illustrates an example of a campaign delivery and a campaign reach, in accordance with various embodiments of the present disclosure;

FIG. 13 illustrates an example for sending message for the marketing campaign, in accordance with various embodiments of the present disclosure;

FIG. 14 illustrates an example of a "single message" for the marketing campaign, in accordance with various embodiments of the present disclosure;

FIG. 15 illustrates an example of an "A/B test" for the marketing campaign, in accordance with various embodiments of the present disclosure;

FIG. 16 illustrates an example of a "setup" for the marketing campaign, in accordance with various embodiments of the present disclosure;

FIG. 17 illustrates an example of an "overview" for engagement of the marketing campaign, in accordance with various embodiments of the present disclosure;

FIGS. 18A and 18B illustrate a flow chart of the method for segmentation of the plurality of users in real-time, in accordance with various embodiments of the present disclosure; and FIG. 19 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

FIG. 1 illustrates a block diagram 100 of one or more online platforms 102, in accordance with various embodiments of the present disclosure. In general, online platform is a computing platform which enables various individuals to obtain, upload and access valuable resources or services. In addition, the one or more platforms 102 include a plurality of contents. In an embodiment of the present disclosure, the plurality of contents includes but may not be limited to a plurality of OTT media contents, a plurality of products, a plurality of financial services, and one or more social media contents. In another embodiment of the present disclosure, the plurality of contents includes but may not be limited to a plurality of health services, a plurality of educational services, a plurality of real estate services, and a plurality of travel services.

The one or more online platforms 102 correspond to a plurality of webpages. In general, a webpage is a web resource on the World Wide Web for any online platform. In an embodiment of the present disclosure, the one or more online platforms 102 correspond to personal webpages. In another embodiment of the present disclosure, the one or more online platforms 102 correspond to commercial webpages. In yet another embodiment of the present disclosure, the one or more online platforms 102 correspond to government webpages. In yet another embodiment of the present disclosure, the one or more online platforms 102 correspond to non-profit organization webpages. However, the one or more online platforms 102 are not limited to the above-mentioned online platforms.

In addition, the one or more online platforms 102 include an over-the top media platform 102A, an e-commerce platform 102B, a fintech platform 102C, a social media platform 102D, and a health platform 102E. Further, the one or more online platforms 102 include an educational platform 102F, a real estate and housing platform 102G, and a travel platform 102H. However, the one or more online platforms 102 are not limited to the above-mentioned online platforms.

In an embodiment of the present disclosure, the one or more online platforms 102 include the over-the-top media platform 102A. In general, the over-the-top media platform provides a streaming media service to the various individuals over internet. In addition, the over-the-top media platform 102A has the plurality of OTT media contents. The plurality of OTT media contents includes but may not be limited to drama series, documentaries, anime, comedy series, science based series, kid series, movies, and stand-up comedy shows. The plurality of OTT media contents is searched using a plurality of genre codes on the over-the-top media platform 102A. The plurality of genre codes includes but may not be limited to action and adventure, action comedies, action sci-fi and fantasy, action thrillers, anime action, region based action content, crime action, and classic action. In an example, an individual I opens an over-the-top media platform O1 on a web browser W1 to watch live baseball match on a communication device D1 (let's say a smartphone) using internet connection.

In an embodiment of the present disclosure, the one or more online platforms 102 include the e-commerce platform 102B. In general, the e-commerce platform provides an online service of buying or selling of various products over the Internet. In addition, the e-commerce platform 102B has the plurality of products. The plurality of products includes but may not be limited to laptops, tablets, mobiles, clocks, decorative accessories, books, home appliances, shoes, bags, jewelry, clothes, stationery, golf kit, and baseball bat. The plurality of products is searched using a plurality of sections on the e-commerce platform 102B. The plurality of sections includes but may not be limited to books and audible, movies and games, electronics, toys, clothes, sports, health and beauty, business, industry, science, and handmade. In an example, an Individual I opens an e-commerce platform E1 on a web browser W1 on a communication device D1 (let's say a desktop) to surf various shirt brands.

In an embodiment of the present disclosure, the one or more online platforms 102 include the fintech platform 102C. In general, the fintech platform provides an online financial services to the various individuals over the Internet. In addition, the fintech platform 102C includes the plurality of financial services. The plurality of financial services includes but may not be limited to car buying loans, house buying loans, credit cards, net banking, commercial banking, opening saving accounts, home equity, and stock exchange investment. However, the plurality of financial services is not limited to the above-mentioned financial services. In an example, an individual I searches for best education loan plan for higher studies on a fintech platform F1 on a web browser W1 through a communication device D1 (let's say a laptop).

In an embodiment of the present disclosure, the one or more online platforms 102 include the social media platform 102D. In general, the social media platform facilitates creating and sharing of contents for various individuals over the internet. In addition, the social media platform 102D has the one or more social media contents. The one or more social media contents includes but may not be limited to online games, business blogs, retail products, live video streams, text messages, multimedia contents, educational content, current affairs, and real-time activity updates. However, the one or more social media contents are not limited to the above-mentioned contents. In an example, an individual I promotes electronic product P1 on a social media platform S1 opened on a web browser W1 using a business page 131 on a communication device D1 (let's say a desktop).

In an embodiment of the present disclosure, the one or more online platforms 102 include the heath platform 102E. In general, the health platform enables the various individuals to access personalized digital healthcare, diet and medicines to enhance the efficiency of healthcare delivery. In addition, the health platform 102E provides the plurality of health services. The plurality of health services includes but may not be limited to diet plans, medicines, physician clinics, nearest hospital, nearest fitness clubs, exercises, yoga classes, aerobics, healthy food orders, and medical tests. However, the plurality of health services is not limited to the above-mentioned services. In an example, a patient P1 searches for bronchial asthma medicine M1 on a fintech platform F1 opened on a web browser W1 through a communication device D1 (let's say a tablet).

In an embodiment of the present disclosure, the one or more online platforms 102 include the education platform 102F. In general, the education platform enables students and parents to access personalized digital educational information, tools and resources to enhance the efficiency of educational development. In addition, the education platform 102F provides the plurality of educational services. The plurality of educational services includes but may not be limited to live teacher-student interaction, online subject wise informative media contents, entrance examination preparatory matters, and technical support for educational projects. However, the plurality of educational services is not limited to the above-mentioned services. In an example, a student S1 finds difficult to solve an integration problem 11. The student S1 searches for online lecture for integrations on an education platform E1 through a communication device D1 (let's say a smartphone).

In an embodiment of the present disclosure, the one or more online platforms 102 include the real estate and housing platform 102G. In general, the real estate and housing platform enables the various individuals to access personalized digital real estate and housing information and minimizes efforts of the corresponding individual. In addition, the real estate and housing platform 102G provides the plurality of real estate services. The plurality of real estate services includes but may not be limited to houses on rent, properties on sale, house cleaning, garbage disposal, home repair, maintenance, and interior designing. However, the plurality of real estate services is not limited to the above-mentioned services. In an example, an individual I surfs for an apartment A1 in New York on a real estate platform through a communication device D2 (let's say a laptop).

In an embodiment of the present disclosure, the one or more online platforms 102 include the travel platform 102H. In general, the travel platform enables the various individuals to access personalized digital travel and hospitality information. In addition, the travel platform 102H provides the plurality of travel services. The plurality of travel services includes but may not be limited to flight booking, train booking, taxi hiring, vacation deals, hotel booking, travel destination information, couch-surfing travel, and hot restaurant deals. However, the plurality of travel services is not limited to the above-mentioned services. In an example, an individual I wants to book a hotel room R1 in Miami. The individual I surfs on a travel platform T1 through a communication device D1 (let's say a workstation).

FIG. 2 illustrates a general overview of an interactive system 200 enabling interaction of a plurality of users 202 on the one or more online platforms 102 in real-time, in accordance with various embodiments of the present disclosure. The interactive system 200 is any environment facilitating interaction of the plurality of users 202 with the one or more online platforms 102. In addition, the interactive system 200 includes the plurality of users 202, one or more communication devices 204, and the one or more online platforms 102.

The interactive system 200 includes the plurality of users 202. In addition, the plurality of users 202 may be any person or individual accessing the one or more communication devices 204. In an embodiment of the present disclosure, the plurality of users 202 is an owner of the one or more communication devices 204. In another embodiment of the present disclosure, the plurality of users 202 is not the owner of the one or more communication devices 204. In an embodiment of the present disclosure, the plurality of users 202 accesses the one or more communication devices 204 at home. In another embodiment of the present disclosure, the plurality of users 202 accesses the one or more communication devices 204 at a cafe. In yet another embodiment of the present disclosure, the plurality of users 202 accesses the one or more communication devices 204 in an office. In an example, a user U1 accesses a smartphone S1 while sitting in a living room. In another example, a user U2 accesses a laptop L1 while travelling from one place to another. In yet another example, a user U3 accesses a desktop computer D1 while working in the office.

The interactive system 200 includes the one or more communication devices 204. The plurality of users 202 is connected with the interactive system 200 through the one or more communication devices 204. In an embodiment of the present disclosure, the one or more communication devices 204 facilitate access to the one or more online platforms 102. In an embodiment of the present disclosure, each of the one or more communication devices 204 is a portable communication device. The portable communication device includes but may not be limited to a laptop, a smartphone, a tablet, and a smart watch. In an example, the smartphone may be an iOS-based smartphone, an android-based smartphone, a windows-based smartphone and the like. In another embodiment of the present disclosure, each of the one or more communication devices 204 is a fixed communication device. The fixed communication device includes but may not be limited to a desktop, a workstation, a smart TV and a mainframe computer. In an embodiment of the present disclosure, the one or more communication devices 204 are currently in the switched-on state. The one or more communication devices 204 are any type of devices having an active internet. In addition, each of the plurality of users 202 accesses corresponding communication device of the one or more communication devices 204 in real-time.

In an embodiment of the present disclosure, the one or more communication devices 204 perform computing operations based on a suitable operating system installed inside the one or more communication devices 204. In general, the operating system is system software that manages computer hardware and software resources and provide common services for computer programs. In addition, the operating system acts as an interface for software installed inside the one or more communication devices 204 to interact with hardware components of the one or more communication devices 204. In an embodiment of the present disclosure, each of the one or more communication devices 204 performs computing operations based on any suitable operating system designed for the portable communication device. In an example, the operating system installed inside the one or more communication devices 204 is a mobile operating system. Further, the mobile operating system includes but may not be limited to windows operating system, android operating system, iOS operating system, symbian operating system, bada operating system from Samsung Electronics and BlackBerry operating system, and sailfish. However, the operating system is not limited to above mentioned operating systems. In an embodiment of the present disclosure, the one or more communication devices 204 operate on any version of particular operating system corresponding to above mentioned operating systems.

In another embodiment of the present disclosure, the one or more communication devices 204 perform computing operations based on any suitable operating system designed for fixed communication device. In an example, the operating system installed inside the one or more communication devices 204 is windows. In another example, the operating system installed inside the one or more communication devices 204 is Mac. In yet another example, the operating system installed inside the one or more communication devices 204 is Linux based operating system. In yet another example, the operating system installed inside the one or more communication devices 204 is Chrome OS. In yet another example, the operating system installed inside the one or more communication devices 204 may be one of UNIX, Kali Linux, and the like. However, the operating system is not limited to above mentioned operating systems.

In an embodiment of the present disclosure, the one or more communication devices 204 operate on any version of windows operating system. In another embodiment of the present disclosure, the one or more communication devices 204 operate on any version of Mac operating system. In yet another embodiment of the present disclosure, the one or more communication devices 204 operate on any version of Linux operating system. In yet another embodiment of the present disclosure, the one or more communication devices 204 operate on any version of Chrome OS. In yet another embodiment of the present disclosure, the one or more communication devices 204 operate on any version of particular operating system corresponding to above mentioned operating systems.

In an embodiment of the present disclosure, the one or more online platforms 102 are run on a plurality of web browsers installed on the one or more communication devices 204. In general, the web browsers is any software application for accessing information on the World Wide Web. In an example, the plurality of web browsers includes but may not be limited to Opera, Mozilla Firefox, Google Chrome, Internet Explorer, Microsoft Edge, Safari and UC Browser. In addition, the plurality of web browsers installed on the one or more communication devices 204 runs on any version of the respective web browser of the above mentioned web browsers. In an example, a user U1 opens a webpage of an e-commerce platform E1 to buy cutlery items on a web browser W1. In another example, a user U2 accesses a fintech webpage F2 on google chrome browser for a car loan. The one or more online platforms 102 allows the plurality of users 202 to access the plurality of contents.

The interactive system 200 includes the over-the top media platform 102A. The plurality of users 202 connects with the over-the top media platform 102A on the one or more communication devices 204 to access the plurality of OTT media contents. In an embodiment of the present disclosure, the over-the top media platform 102A is accessed on the one or more communication devices 204 through the plurality of web browsers. In an example, a user U1 watches a sci-fi movie M1 on an OTT platform O1 on a web browser W1 (let's say internet explorer) through a communication device D1 (let's say a smartphone). In another example, a user U2 watches a stand-up comedy show S2 on an OTT platform O2 on a communication device D2 (let's say a desktop computer) through a web browser W2 (let's say Google Chrome). In yet another example, a user U3 adds an anime A3 to a watch-list W3 on an OTT platform O3 on a communication device D3 (let's say a tablet) through a web browser W3 (let's say Microsoft Edge).

The interactive system 200 includes the e-commerce platform 102B. The plurality of users 202 connects with the e-commerce platform 102B on the one or more communication devices 204 to access the plurality of products. In an embodiment of the present disclosure, the e-commerce platform 102B is accessed on the one or more communication devices 204 through the plurality of web browsers. In an example, a user U1 surfs various smartwatches S1 on an e-commerce platform E1 on a communication device D1 (let's say a smartphone) through a web browser W1 (let's say Mozilla Firefox). In another example, a user U2 buys a grooming kit G2 on an e-commerce platform E2 on a communication device D2 (let's say a desktop computer) through a web browser W2 (let's say UC Browser). In yet another example, a user U3 adds a musical instrument M3 to a cart on an e-commerce platform E3 on a communication device D3 (let's say a tablet) through a web browser W3 (let's say Opera Browser).

The interactive system 200 includes the fintech platform 102C. The plurality of users 202 connects with the fintech platform 102C on the one or more communication devices 204 to access the plurality of financial services. In an embodiment of the present disclosure, the fintech platform 102C is accessed on the one or more communication devices 204 through the plurality of web browsers. In an example, a user U1 surfs various account opening options O1 on a fintech platform F1 on a communication device D1 (let's say a smartphone) through a web browser W1 (let's say Safari Browser). In another example, a user U2 requests for car loan L2 on a finetech platform F2 on a communication device D2 (let's say a desktop computer) through a web browser W2 (let's say Google Chrome). In yet another example, a user U3 buys a credit card C3 on a fintech platform F3 on a communication device D3 (let's say a tablet) through a web browser W3 (let's say Microsoft Edge).

The interactive system 200 includes the social media platform 102D. The plurality of users 202 connects with the social media platform 102D on the one or more communication devices 204 to access the one or more social media contents. In an embodiment of the present disclosure, the social media platform 102D is accessed on the one or more communication devices 204 through the plurality of web browsers. In an example, a user U1 surfs various multimedia content C1 (let's say a teaser of a music video) on a social media platform S1 on a communication device D1 (let's say a smartphone) through a web browser W1 (let's say UC Browser). In another example, a user U2 promotes a handcraft product P2 (let's say a woodcraft vase) on a social media platform S2 on a communication device D2 (let's say a desktop computer) through a web browser W2 (let's say Mozilla Firefox). In yet another example, a user U3 streams live video V3 on a social media platform S3 through a web browser W3 (let's say Opera Browser). In yet another example, a manufacturer of goods, a service provider, and a retailer may join a social media platform S4. The social media platform S4 allows users U4 to be connected to the manufacturer of goods, the service provider, and the retailer.

The interactive system 200 includes the health platform 102E. The plurality of users 202 connects with the health platform 102E on the one or more communication devices 204 to access the plurality of health services. In an embodiment of the present disclosure, the health platform 102E is accessed on the one or more communication devices 204 through the plurality of web browsers. In an example, a user U1 surfs various healthcare contents (let's say a tuberculosis medicine) on a health platform H1 on a communication device D1 (let's say a smartphone) through a web browser W1 (let's say Microsoft Edge). In another example, a user U2 creates a dietary plan on a health platform H2 on a communication device D2 (let's say a desktop computer) through a web browser W2 (let's say Mozilla Firefox). In yet another example, a user U3 buys medicine M3 (let's say diabetes medicines) on a health platform H3 on a communication device D3 (let's say a tablet) through a web browser W3 (let's say Google Chrome).

The interactive system 200 includes the education platform 102F. The plurality of users 202 connects with the education platform 102F on the one or more communication devices 204 to access the plurality of educational services. In an embodiment of the present disclosure, the education platform 102F is accessed on the one or more communication devices 204 through the plurality of web browsers. In an example, a user U1 surfs various mathematical training videos (let's say a differential equation lecture) on an education platform E1 on a communication device D1 (let's say a smartphone) through a web browser W1 (let's say UC Browser). In another example, a user U2 submits online science project (let's say a hydraulic power brakes) on an education platform E2 on a communication device D2 (let's say a desktop computer) through a web browser W2 (let's say Opera Browser). In yet another example, a user U3 prepares for common entrance exam on an education platform E3 on a communication device D3 (let's say a tablet) through a web browser W3 (let's say Safari Browser).

The interactive system 200 includes the real estate and housing platform 102G. The plurality of users 202 connects with the real estate and housing platform 102G on the one or more communication devices 204 to access the plurality of real estate services. In an embodiment of the present disclosure, the real estate and housing platform 102G is accessed on the one or more communication devices 204 through the plurality of web browsers. In an example, a user U1 surfs various apartments (let's say a studio apartment) on sale on a real estate platform R1 on a communication device D1 (let's say a smartphone) through a web browser W1 (let's say Mozilla Firefox). In another example, a user U2 requests property seller contact details on a real estate platform R2 on a communication device D2 (let's say a desktop computer) through a web browser W2 (let's say Google Chrome). In yet another example, a user U3 uploads images of a property (let's say a penthouse) for sale on a real estate platform R3 on a communication device D3 (let's say a tablet). In yet another example, a user U4 negotiates online for rent of a bungalow on a real estate platform R4 on a communication device D4 (let's say a laptop) through a web browser W4 (let's say Microsoft Edge).

The interactive system 200 includes the travel platform 102H. The plurality of users 202 connects with the travel platform 102H on the one or more communication devices 204 to access the plurality of travel services. In an embodiment of the present disclosure, the travel platform 102H is accessed on the one or more communication devices 204 through the plurality of web browsers. In an example, a user U1 surfs various flight options to travel from California to Chicago on a travel platform T1 on a communication device D1 (let's say a smartphone) through a web browser W1 (let's say UC browser). In another example, a user U2 requests price quotations for fifty hotel rooms in Cleveland on a travel platform T2 on a communication device D2 (let's say a desktop computer) through a web browser W2 (let's say Safari Browser). In yet another example, a user U3 uploads images of food (let's say a Thai Food) on a travel platform T3 on a communication device D3 (let's say a tablet). In yet another example, a user U4 books holiday package (let's say 5 days and 6 nights) for Switzerland on a travel platform T4 on a communication device D4 (let's say a laptop) through a web browser W4 (let's say Opera Browser).

FIG. 3 illustrates an interactive computing environment 300 for segmentation of the plurality of users 202 in real-time, in accordance with various embodiments of the present disclosure. The interactive computing environment 300 includes the plurality of users 202, the one or more communication devices 204, a communication network 302, and the one or more online platforms 102. In addition, the interactive computing environment 300 includes a user segmentation system 304, a server 306, a database 306a, and an administrator 308. The above stated elements of the interactive computing environment 300 operate coherently and synchronously to enable segmentation of the plurality of users 202 in real-time.

The interactive computing environment 300 includes the plurality of users 202. The plurality of users 202 corresponds to any number of person or individual associated with the user segmentation system 304. The user segmentation system 304 accesses behavior of each of the plurality of users 202 on the one or more online platforms 102 through the one or more communication devices 204 using the communication network 302. In an example, a user U1 watches action movie on a webpage W1 of an online platform P1 through a communication device D1 (let's say a smartphone). In another example, a user U2 clicks on notification N2 (let's say renew of subscription with 25% discount) while surfing on a webpage W2 of an online platform P2 on a communication device D2 (let's say a desktop computer). In yet another example, a user U3 initiates video on demand transaction on a webpage W3 of an online platform P3 through a communication device D3 (let's say a laptop).

The interactive computing environment 300 includes the plurality of users 202. In addition, the plurality of users 202 accesses the one or more online platforms 102 through the one or more communication devices 204. Further, the one or more communication devices 204 are associated with the plurality of users 202. Furthermore, the user segmentation system 304 receives a first set of data associated with the plurality of users 202. The first set of data corresponds to personal information of the plurality of users 202. Moreover, the first set of data includes but may not be limited to name data, age data, e-mail identity data, contact number data, gender data, geographic location data, and angiographic data. Also, the first set of data includes but may not be limited to demographic data, payment cards data, banking partners data, and relationship status data. In an embodiment of the present disclosure, the first set of data is received from one or more online platform database, one or more communication device database, and third party database. In another embodiment of the present disclosure, the first set of data is received from the plurality of users 202. In an example, a user U1 may provide his or her name, profile picture, city of residence, contact information, birth date, gender, marital status, employment, educational background, interests, and other demographic information.

In an example, a user U2 provides name data on an OTT platform P1 while subscribing through a communication device D1 (let's say a smartphone). In another example, a user U3 installs various mobile applications on a communication device D2 (let's say a desktop computer) through an application store using internet connection. In yet another example, a student S1 chooses fifth standard while accessing geography lecture on an educational platform P2 through a communication device D3 (let's say a tablet). In yet another example, a user U4 provides an email-identity for receiving a real-time updates of regular health check-ups on a health platform P3 through a communication device D4 (let's say a laptop) using internet. In yet another example, a user U5 provides contact number on a fintech platform P4 to receive real-time text updates regarding saving account through a communication device D5 (let's say a smartphone).

In an embodiment of the present disclosure, the first set of data is received from the over-the-top media platform 102A. In another embodiment of the present disclosure, the first set of data is received from the e-commerce platform 102B. In yet another embodiment of the present disclosure, the first set of data is received from the fintech platform 102C. In yet another embodiment of the present disclosure, the first set of data is received from the social media platform 102D. In yet another embodiment of the present disclosure, the first set of data is received from the health platform 102E. In yet another embodiment of the present disclosure, the first set of data is received from the education platform 102F. In yet another embodiment of the present disclosure, the first set of data is received from the real-estate and housing platform 102G. In yet another embodiment of the present disclosure, the first set of data is received from the travel platform 102H.

The interactive computing environment 300 includes the plurality of users 202 who is any person present at any location and accessing the plurality of contents. In addition, the plurality of contents is associated with the one or more online platforms 102. The plurality of users 202 is any legal person or natural person who access the plurality of contents and need an IP based network for accessing the plurality of contents. In addition, the plurality of users 202 is an individual or person who access the plurality of contents on the one or more platforms 102 through the one or more communication devices 204. The plurality of users 202 is associated with the one or more communication devices 204.

In an embodiment of the present disclosure, the plurality of users 202 accesses the plurality of OTT media contents on the over-the-top media platform 102A. In another embodiment of the present disclosure, the plurality of users 202 accesses the plurality of products on the e-commerce platform 102B. In yet another embodiment of the present disclosure, the plurality of users 202 accesses the plurality of financial services on the fintech platform 102C. In yet another embodiment of the present disclosure, the plurality of users 202 accesses the one or more social media contents on the social media platform 102D. In yet another embodiment of the present disclosure, the plurality of users 202 accesses the plurality of health services on the health platform 102E. In yet another embodiment of the present disclosure, the plurality of users 202 accesses the plurality of educational services on the education platform 102F. In yet another embodiment of the present disclosure, the plurality of users 202 accesses the plurality of real estate services on the real-estate and housing platform 102G. In yet another embodiment of the present disclosure, the plurality of users 202 accesses the plurality of travel services on the travel platform 102H.

The interactive computing environment 300 includes the one or more communication devices 204 which enable the plurality of users 202 to access the one or more online platforms 102. The one or more communication devices 204 are internet-enabled device for allowing the plurality of users 202 to access the one or more online platforms 102. In an embodiment of the present disclosure, the plurality of users 202 is the owner of the one or more communication devices 204. In another embodiment of the present disclosure, the plurality of users 202 is not the owner of the one or more communication devices 204.

In an embodiment of the present disclosure, the plurality of users 202 accesses the over-the-top media platform 102A on the one or more communication devices 204 through the plurality of web browsers. In another embodiment of the present disclosure, the plurality of users 202 accesses the e-commerce platform 102B on the one or more communication devices 204 through the plurality of web browsers. In yet another embodiment of the present disclosure, the plurality of users 202 accesses the fintech platform 102C on the one or more communication devices 204 through the plurality of web browsers. In yet another embodiment of the present disclosure, the plurality of users 202 accesses the social media platform 102D on the one or more communication devices 204 through the plurality of web browsers. In yet another embodiment of the present disclosure, the plurality of users 202 accesses the health platform 102E on the one or more communication devices 204 through the plurality of web browsers. In yet another embodiment of the present disclosure, the plurality of users 202 accesses the education platform 102F on the one or more communication devices 204 through the plurality of web browsers. In yet another embodiment of the present disclosure, the plurality of users 202 accesses the real-estate and housing platform 102G on the one or more communication devices 204 through the plurality of web browsers. In yet another embodiment of the present disclosure, the plurality of users 202 accesses the travel platform 102H on the one or more communication devices 204 through the plurality of web browsers.

The interactive computing environment 300 includes the one or more communication devices 204. The one or more communication devices 204 provide an interface for the plurality of users 202 to interact with the interactive computing environment 300. The plurality of users 202 can interact with the interactive computing environment 300 through more than one device of the one or more communication devices 204. In an example, a user U1 connects with the interactive computing environment 300 through a communication device D1 (let's say a smartphone) to watch video on demand at home. In another example, a user U2 connects with the computing environment 300 through a communication device D2 (let's say a desktop computer) at home. The user U2 connects with the computing environment 300 with a communication device D3 (let's say a tablet) while travelling.

Each of the one or more communication devices 204 comprises of a memory. In general, the memory includes computer-storage media in the form of volatile and/or non-volatile memory. The memory may be removable, non-removable, or a combination thereof. Exemplary hardware devices include solid-state memory, hard drives, optical-disc drives, etc. The memory is coupled with one or more processors. In general, the one or more processor read data from various entities such as memory or I/O components. The one or more processor execute the one or more instructions which are stored in the memory. The one or more processors provide execution method for one or more instructions provided by the user segmentation system 304.

The one or more communication devices 204 are a media device. The one or more communication devices 204 enable the plurality of users 202 to access the plurality of contents on the one or more online platforms 102. The one or more communication devices 204 support various multimedia contents. The plurality of users 202 accesses the plurality of contents in real-time through the one or more communication devices 204. In an embodiment of the present disclosure, the plurality of contents is a video stream. In another embodiment of the present disclosure, the plurality of contents corresponds to video on demand being accessed on the one or more communication devices 204. In yet another embodiment of the present disclosure, the plurality of contents is an audio clip. In yet another embodiment of the present disclosure, the plurality of contents corresponds to an e-commerce product. In yet another embodiment of the present disclosure, the plurality of contents is an illustration. In yet another embodiment of the present disclosure, the plurality of contents is an e-book.

The interactive computing environment 300 includes the one or more online platforms 102. The plurality of users 202 performs various activities on the one or more online platforms 102 through the one or more communication devices 204. In addition, the plurality of users 202 accesses the plurality of contents on the one or more online platforms 102 in real-time. In an example, a user U1 watches comedy show C1 on online platform P1 through a communication device D1 (let's say a smartphone). In another example, a user U2 explores smart watches on the online platform P2 through the communication device D2 (let's say a desktop computer) in real-time. In yet another example, a user U3 reads fiction novel N1 on online platform P3 through a communication device D3 (let's say a laptop) in real-time. In yet another example, a user U4 clicks on notification N2 while watching adventure movie M1 on online platform P4 through a communication device D4 (let's say a tablet) in real-time. Further, the one or more online platforms 102 include the over-the top media platform 102A, the e-commerce platform 102B, the fintech platform 102C, the social media platform 102D, and the health platform 102E. Furthermore, the one or more online platforms 102 include the educational platform 102F, the real estate and housing platform 102G, and the travel platform 102H. However, the one or more online platforms 102 are not limited to the above-mentioned online platforms.

The interactive computing environment 300 includes the communication network 302. The one or more communication devices 204 are connected to the communication network 302. The communication network 302 provides a medium for the plurality of users 202 accessing the plurality of contents on the one or more online platforms 102 to connect with the user segmentation system 304. In an embodiment of the present disclosure, the communication network 302 is an internet connection. In another embodiment of the present disclosure, the communication network 302 is a wireless mobile network. In yet another embodiment of the present disclosure, the communication network 302 is a wired network with a finite bandwidth. In yet another embodiment of the present disclosure, the communication network 302 is a combination of the wireless and the wired network for the optimum throughput of data transmission. In yet another embodiment of the present disclosure, the communication network 302 is an optical fiber high bandwidth network that enables a high data rate with negligible connection drops. The communication network 302 includes a set of channels. Each channel of the set of channels supports a finite bandwidth. Moreover, the finite bandwidth of each channel of the set of channels is based on capacity of the communication network 302. The communication network 302 connects the one or more communication devices 204 to the user segmentation system 304 using a plurality of methods. The plurality of methods used to provide network connectivity to the one or more communication devices 204 includes 2G, 3G, 4G, 5G, Wifi and the like.

The interactive computing environment 300 includes the user segmentation system 304 which is associated with the one or more online platforms 102 and the plurality of users 202. In addition, the user segmentation system 304 enables segmentation of the plurality of users 202 in real-time based on the various activities of the plurality of users 202. The user segmentation system 304 enables the granular level segmentation of the plurality of users 202 based on analysis done on various activities of the plurality of users 202 on the one or more platforms 102 at the granular level. The user segmentation system 304 creates one or more segments based on analysis done on various activities of the plurality of users 202. The user segmentation system 304 triggers initialization of one or more marketing campaigns based on the one or more segments.

The user segmentation system 304 receives the first set of data associated with the plurality of users 202 in real-time. The plurality of users 202 is associated with the one or more communication devices 204. In addition, the first set of data corresponds to the personal information of the plurality of users 202. The first set of data includes but may not be limited to name data, age data, e-mail identity data, contact number data, gender data, and geographic location data. In addition, the first set of data includes but may not be limited to, angiographic data, demographic data, payment cards data, banking partners data, and relationship status data. In an example, users U1 provide name data D1 on an online platform P1 while signing up for accessing various services and contents through communication devices C1 (let's say smartphones). In another example, users U2 provide e-mail identity data D2 on an online platform P2 before accessing various contents and services through communication devices C2 (let's say desktop computers). In yet another example, users U3 provide demographic data D3 on an online platform P3 while signing up for accessing various services and contents through communication devices C3 (let's say tablets). In yet another example, users U4 provide geographic data D4 on an online platform P4 while signing up for accessing various services and contents through communication devices C4 (let's say laptops). In yet another example, users U5 provide angiographic data on an online health platform P5 while accessing various services and contents.

In an embodiment of the present disclosure, the user segmentation system 304 accesses the first set of data from the over-the-top media platform 102A through the communication network 302. In another embodiment of the present disclosure, the user segmentation system 304 accesses the first set of data from the e-commerce platform 102B through the communication network 302. In yet another embodiment of the present disclosure, the user segmentation system 304 accesses the first set of data from the fintech platform 102C through the communication network 302. In yet another embodiment of the present disclosure, the user segmentation system 304 accesses the first set of data from the social media platform 102D through the communication network 302. In yet another embodiment of the present disclosure, the user segmentation system 304 accesses the first set of data from the health platform 102E through the communication network 302. In yet another embodiment of the present disclosure, the user segmentation system 304 accesses the first set of data from the education platform 102F through the communication network 302. In yet another embodiment of the present disclosure, the user segmentation system 304 accesses the first set of data from the real-estate and housing platform 102G through the communication network 302. In yet another embodiment of the present disclosure, the user segmentation system 304 accesses the first set of data from the travel platform 102H through the communication network 302. In addition, the first set of data may be received from the one or more online platform database, the one or more communication device database, and the third party database.

The user segmentation system 304 fetches a second set of data associated with a plurality of past events of the plurality of users 202 on the plurality of webpages of the one or more online platforms 102. In general, a webpage is a web resource on the World Wide Web for any online platform. In addition, the second set of data corresponds the plurality of past events of the plurality of users 202 on the granular level. In an example, the plurality of past events includes but may not be limited to past uniform resource locater visits, past number of visits, past number of pages accessed, past webpage visited, and past accessed content. In another example, the plurality of past events includes but may not be limited to past started content, past paused content, past resumed content, past searched content, past notification clicks, and past notification views. In yet another example, the plurality of past events includes but may not be limited to past products surfed, past products added to cart, past reviews for products, past favorite product category, and past inactivity for products. In yet another example, the plurality of past events includes but may not be limited to past accounts opened, past credit card requests, past credit cards issued, past loan requests, and past net-banking requests. In yet another example, the plurality of past events includes but may not be limited to past multimedia content surfed, past multimedia content watched, past texts exchanged, past business blogs, and past live media streamed. In yet another example, the plurality of past events includes but may not be limited to past audio-video callings, past medicines searched, past medicines bought, and past medical test kit bought. In yet another example, the plurality of past events includes but may not be limited to past medical tests scheduled, past bill payments, past doctor consultation scheduled, and past hospital visit planned. In yet another example, the plurality of past events includes but may not be limited to past dietary plan requested, past personal trainer hired, past fitness center searched, and past educational video searched. In yet another example, the plurality of past events includes but may not be limited to past educational video watched, past projects submitted, past mock tests subscribed, and past educational counselling requested. In yet another example, the plurality of past events includes but may not be limited to past problem solving session requested, past international masters interests, and past properties searched. In yet another example, the plurality of past events includes but may not be limited to past properties watched, past properties bought, past rented properties searched, and past maintenance services requested. In yet another example, the plurality of past events includes but may not be limited to past hotel searched, past hotels added to watch-list, past hotel bookings, past holiday plans searched, and past holiday plans booked. In yet another example, the plurality of past events includes but may not be limited to past stock exchange investments, past money donated, past inactivity for product category, and past account created. In yet another example, the plurality of past events includes but may not be limited to past products bought, past repeated products, past subscriptions, past subscription renewals, and past subscription skipped. In yet another example, the plurality of past events includes but may not be limited to past initiated transactions, past failed transactions, past content added to cart, and past completed transactions. In yet another example, the plurality of past events includes but may not be limited to past most visited category, past content details watched, past video on demand accessed, past video on demand initiated, and past video on demand searched. Further, the second set of data may be fetched from the one or more online platform database, the one or more communication device database, and the third party database.

In an embodiment of the present disclosure, the user segmentation system 304 accesses the second set of data from the over-the-top media platform 102A through the communication network 302. In another embodiment of the present disclosure, the user segmentation system 304 accesses the second set of data from the e-commerce platform 102B through the communication network 302. In yet another embodiment of the present disclosure, the user segmentation system 304 accesses the second set of data from the fintech platform 102C through the communication network 302. In yet another embodiment of the present disclosure, the user segmentation system 304 accesses the second set of data from the social media platform 102D through the communication network 302. In yet another embodiment of the present disclosure, the user segmentation system 304 accesses the second set of data from the health platform 102E through the communication network 302. In yet another embodiment of the present disclosure, the user segmentation system 304 accesses the second set of data from the education platform 102F through the communication network 302. In yet another embodiment of the present disclosure, the user segmentation system 304 accesses the second set of data from the real-estate and housing platform 102G through the communication network 302. In yet another embodiment of the present disclosure, the user segmentation system 304 accesses the second set of data from the travel platform 102H through the communication network 302.

In an embodiment of the present disclosure, the user segmentation system 304 fetches the plurality of past events performed on the over-the-top media platform 102A through the communication network 302. In addition, the plurality of past events performed on the over-the-top media platform 102A includes past content watched, past content paused, and past content added to watch later, and the like. Further, the plurality of past events performed on the over-the-top media platform 102A includes past subscriptions, past subscription renewals, past subscription transaction failures, past content details viewed and the like. Furthermore, the plurality of past events performed on the over-the-top media platform 102A includes past contents added to favorites, past content skipped, past subscription skipped, past most visited category, and the like.

In an example, users U1 watched content C1 (let's say comic anime) on an OTT platform P1 in the past through a communication device D1 (let's say smartphones) using internet. In another example, users U2 paused content C2 (let's say horror movie) on an OTT platform P2 in the past through a communication device D2 (let's say desktop computers) using internet. In yet another example, users U3 added content C3 to a watch later list W1 on an OTT platform P3 in the past through a communication device D3 (let's say tablets) using internet. In yet another example, users U4 subscribed for accessing an OTT platform P4 in the past through a communication device D4 (let's say laptops) using internet. In yet another example, users U5 renewed subscription five times for accessing an OTT platform P5 in the past through a communication device D5 using internet. In yet another example, users U6 failed subscription transactions on an OTT platform P6 for accessing various contents in the past through a communication device D6 using internet. In yet another example, users U7 watched description of content C7 (let's say stand-up comedy show) on an OTT platform P7 in the past through a communication device D7 using internet. In yet another example, users U8 clicked notification N8 on an OTT platform P8 while accessing content C8 in the past through a communication device D8 using internet.

In an embodiment of the present disclosure, the user segmentation system 304 fetches the plurality of past events performed on the e-commerce platform 102B through the communication network 302. In addition, the plurality of past events performed on the e-commerce platform 102B includes past products surfed, past products added to cart, past account created, past products bought, past repeated products and the like. Further, the plurality of past events performed on the e-commerce platform 102B includes past transactions initiated, past transactions completed, past transactions failed, past notification clicks and the like. Furthermore, the plurality of past events performed on the e-commerce platform 102B includes past reviews for products, past favorite product category, past inactivity for products, past inactivity for product category, and the like.

In an example, users U1 surfed a product T1 (let's say sport shoes) on an e-commerce platform P1 in the past through a communication device D1 (let's say smartphones) using internet. In another example, users U2 added a product T2 (let's say a smartphone) to a cart on an e-commerce platform P2 in the past through a communication device D2 (let's say desktop computers) using internet. In yet another example, users U3 created online account A3 to buy a product T3 (let's say a washing machine) on an e-commerce platform P3 in the past through a communication device D3 (let's say tablets) using internet. In yet another example, users U4 bought a product T4 (let's say a smartwatch) while accessing an e-commerce platform P4 in the past through a communication device D4 (let's say laptops) using internet. In yet another example, users U5 repeatedly bought a product T5 (let's say a formal trouser) on an e-commerce platform P5 in the past through a communication device D5 using internet. In yet another example, users U6 initiated payment transaction 16 for a product T6 (let's say a non-fiction book) on an e-commerce platform P6 in the past through a communication device D6 using internet. In yet another example, users U7 completed payment transaction C7 for a product T7 (let's say a Bluetooth speaker) on an e-commerce platform P7 in the past through a communication device D7 using internet. In yet another example, users U8 left payment transaction L8 for a product T8 (let's say a mattress) on an e-commerce platform P8 in the past through a communication device D8 using internet. In yet another example, users U9 reviewed a product T9 (let's say a play station) on an e-commerce platform P9 in the past through a communication device D9 using internet.

In an embodiment of the present disclosure, the user segmentation system 304 fetches the plurality of past events performed on the fintech platform 102C through the communication network 302. In addition, the plurality of past events performed on the fintech platform 102C includes past accounts opened, past credit card requests, past credit cards issued, past loan requests, past net-banking requests and the like. Further, the plurality of past events performed on the fintech platform 102C includes past bill payments, past stock exchange investments, past money donated, past notifications clicked and the like. Furthermore, the plurality of past events performed on the fintech platform 102C includes past transaction initiated, past transaction failed, past transaction left, past transaction completed and the like.

In an example, users U1 opened an account A1 (let's say a saving account) on a fintech platform P1 in the past through a communication device D1 (let's say smartphones) using internet. In another example, users U2 requested for a credit card C2 on a fintech platform P2 in the past through a communication device D2 (let's say desktop computers) using internet. In yet another example, users U3 requested for loan L3 (let's say a home loan) on a fintech platform P3 in the past through a communication device D3 (let's say tablets) using internet. In yet another example, users U4 requested to start net-banking service on a fintech platform P4 in the past through a communication device D4 (let's say laptops) using internet. In yet another example, users U5 paid a bill B5 (let's say a broadband bill) through a fintech platform P5 in the past through a communication device D5 using internet. In yet another example, users U6 invested money in stock exchange S6 on a fintech platform P6 in the past through a communication device D6 using internet. In yet another example, users U7 donated money for social, disaster, environment and economical campaigns S7 (let's say a donation for Tsunami victims) on a fintech platform P7 in the past through a communication device D7 using internet. In yet another example, users U8 clicked a notification N8 on a fintech platform P8 in the past through a communication device D8 using internet. In yet another example, users U9 initiated transaction T9 (let's say $50) for credit card payments on a fintech platform P9 in the past through a communication device D9 using internet. In yet another example, users U10 completed transaction T10 (let's say $100) for a grocery store G10 on a fintech platform P10 in the past through a communication device D10 using internet.

In an embodiment of the present disclosure, the user segmentation system 304 fetches the plurality of past events performed on the social media platform 102D through the communication network 302. In addition, the plurality of past events performed on the social media platform 102D includes past multimedia content surfed, past multimedia content watched, past account created, past texts exchanged, past business blogs and the like. Further, the plurality of past events performed on the social media platform 102D includes past paid promotions, past services activated, past live media streamed, past audio-video callings, and the like.

In an example, users U1 surfed a multimedia content M1 (let's say an animation cartoon) on a social media platform P1 in the past through a communication device D1 (let's say smartphones) using internet. In another example, users U2 watched a multimedia content M2 (let's say an action movie teaser) on a social media platform P2 in the past through a communication device D2 (let's say desktop computers) using internet. In yet another example, users U3 created an online account on a social media platform P3 in the past through a communication device D3 (let's say tablets) using internet. In yet another example, users U4 exchanged a text message T4 (let's say a promotional text message) on a social media platform P4 in the past through a communication device D4 (let's say laptops) using internet. In yet another example, users U5 wrote a business blog B5 (let's say a grooming product business blog) through a social media platform P5 in the past through a communication device D5 using internet. In yet another example, users U6 requested for a paid promotion (let's say a paid promotion for clothing page) on a social media platform P6 in the past through a communication device D6 using internet. In yet another example, users U7 streamed a live video L7 (let's say a live stream of a baseball match) on a social media platform P7 in the past through a communication device D7 using internet. In yet another example, users U8 clicked a notification N8 on a social media platform P8 in the past through a communication device D8 using internet.

In an embodiment of the present disclosure, the user segmentation system 304 fetches the plurality of past events performed on the health platform 102E through the communication network 302. In addition, the plurality of past events performed on the health platform 102E includes past medicines searched, past medicines bought, past medical test kit bought, past medical tests scheduled, and the like. Further, the plurality of past events performed on the health platform 102E includes past transaction initiated, past transaction completed, past doctor consultation scheduled, past hospital visit planned, and the like. Furthermore, the plurality of past events performed on the health platform 102E includes past dietary plan requested, past personal trainer hired, past fitness center searched and the like.

In an example, users U1 searched a medicine M1 (let's say a diabetes medicine) on a health platform P1 in the past through a communication device D1 (let's say smartphones) using internet. In another example, users U2 bought a medicine M2 (let's say a blood pressure medicine) on a health platform P2 in the past through a communication device D2 (let's say desktop computers) using internet. In yet another example, users U3 bought a medical kit M3 (let's say a sugar level test kit) on a health platform P3 in the past through a communication device D3 (let's say tablets) using internet. In yet another example, users U4 scheduled a medical test T4 (let's say a pregnancy test) on a health platform P4 in the past through a communication device D4 (let's say laptops) using internet. In yet another example, users U5 initiated a transaction T5 (let's say $10) for buying a medicine M5 on a health platform P5 in the past through a communication device D5 using internet. In yet another example, users U6 completed a transaction T6 (let's say a $50) for medical kit M6 on a health platform P6 in the past through a communication device D6 using internet. In yet another example, users U7 scheduled a consultation with a doctor D7 (let's say a cardiologist) on a health platform P7 in the past through a communication device D7 using internet. In yet another example, users U8 requested a dietary plan M8 (let's a weight loss diet plan) on a health platform P8 in the past through a communication device D8 using internet. In yet another example, users U9 hired a personal trainer T9 (let's an aerobics instructor) on a health platform P9 in the past through a communication device D9 using internet.

In an embodiment of the present disclosure, the user segmentation system 304 fetches the plurality of past events performed on the education platform 102F through the communication network 302. In addition, the plurality of past events performed on the education platform 102F includes past educational video searched, past educational video watched, past projects submitted, past account created, and the like. Further, the plurality of past events performed on the education platform 102F includes past transaction initiated, past transaction failures, past transaction completed, past notification clicked, and the like. Furthermore, the plurality of past events performed on the education platform 102F includes past mock tests subscribed, past educational counselling requested, past problem solving session requested, past international masters interests and the like.

In an example, users U1 searched an educational video E1 (let's say an educational video on trigonometry) on an education platform P1 in the past through a communication device D1 (let's say smartphones) using internet. In another example, users U2 watched an educational video E2 (let's say an educational video on Anatomy) on an education platform P2 in the past through a communication device D2 (let's say desktop computers) using internet. In yet another example, users U3 submitted an educational project E3 (let's say an educational solar project) on an education platform P3 in the past through a communication device D3 (let's say tablets) using internet. In yet another example, users U4 created an account A4 on an education platform P4 in the past through a communication device D4 (let's say laptops) using internet. In yet another example, users U5 initiated a transaction T5 (let's say $10) for buying a zoology book Z5 on an education platform P5 in the past through a communication device D5 using internet. In yet another example, users U6 completed a transaction T6 (let's say a $50) for a business communication skills lectures B6 on an education platform P6 in the past through a communication device D6 using internet. In yet another example, users U7 clicked a notification N7 on an education platform P7 in the past through a communication device D7 using internet. In yet another example, users U8 subscribed for a mock test M8 (let's a mock test for geography subject) on an education platform P8 in the past through a communication device D8 using internet. In yet another example, users U9 requested a problem solving session S9 (let's a problem solving session with an Integration expert) on an education platform P9 in the past through a communication device D9 using internet.

In an embodiment of the present disclosure, the user segmentation system 304 fetches the plurality of past events performed on the real estate and housing platform 102G through the communication network 302. In addition, the plurality of past events performed on the real estate and housing platform 102G includes past properties searched, past properties watched, past properties bought, past rented properties searched, and the like. In addition, the plurality of past events performed on the real estate and housing platform 102G includes past account created, past maintenance services requested, past transaction initiated, past transaction completed and the like.

In an example, users U1 searched a property E1 (let's say an apartment in California) on a real estate and housing platform P1 in the past through a communication device D1 (let's say smartphones) using internet. In another example, users U2 watched a property E2 (let's say a home in Alaska) on a real estate and housing platform P2 in the past through a communication device D2 (let's say desktop computers) using internet. In yet another example, users U3 bought a property E3 (let's say a commercial property in New York) on a real estate and housing platform P3 in the past through a communication device D3 (let's say tablets) using internet. In yet another example, users U4 created an account A4 on a real estate and housing platform P4 in the past through a communication device D4 (let's say laptops) using internet. In yet another example, users U5 initiated a transaction T5 (let's say $15000) on a real estate and housing platform P5 in the past through a communication device D5 using internet. In yet another example, users U6 completed a transaction T6 (let's say a $5000) on a real estate and housing platform P6 in the past through a communication device D6 using internet. In yet another example, users U7 clicked a notification N7 (let's say a notification suggesting apartments in Chicago) on a real estate and housing platform P7 in the past through a communication device D7 using internet. In yet another example, users U8 requested a maintenance service M8 (let's maintenance of electronic elements) on a real estate and housing platform P8 in the past through a communication device D8 using internet.

In an embodiment of the present disclosure, the user segmentation system 304 fetches the plurality of past events performed on the travel platform 102H through the communication network 302. In addition, the plurality of past events performed on the travel platform 102H includes past hotel searched, past hotels added to watch-list, past hotel bookings, past account created, past holiday plans searched, and the like. Further, the plurality of past events performed on the travel platform 102H includes past holiday plans booked, past transaction initiated, past transaction completed, past restaurant pre-booked, and the like.

In an example, users U1 searched a hotel H1 (let's say a hotel in San Francisco) on a travel P1 in the past through a communication device D1 (let's say smartphones) using internet. In another example, users U2 added a hotel H2 (let's say a hotel in Seattle) to a watch-list W2 on a travel platform P2 in the past through a communication device D2 (let's say desktop computers) using internet. In yet another example, users U3 booked a hotel H3 (let's say a hotel in San Jose) on a travel platform P3 in the past through a communication device D3 using internet. In yet another example, users U4 created an account A4 on a travel platform P4 in the past through a communication device D4 using internet. In yet another example, users U5 searched a holiday plan H5 (let's say a holiday plan to Maldives for 5 days 4 nights) on a travel platform P5 in the past through a communication device D5 (let's say tablets) using internet. In yet another example, users U6 booked a holiday plan H6 (let's say a holiday plan to Cairo for 4 days 5 nights) on a travel platform P6 in the past through a communication device D6 using internet. In yet another example, users U7 initiated a transaction T7 (let's say $150) on a travel platform P7 in the past through a communication device D7 using internet. In yet another example, users U8 completed a transaction T8 (let's say a $500) on a travel platform P8 in the past through a communication device D8 (let's say laptops) using internet. In yet another example, users U9 clicked a notification N9 (let's say a notification suggesting Holiday plans for Switzerland) on a travel platform P9 in the past through a communication device D9 using internet. In yet another example, users U10 pre-booked a restaurant R10 (let's an Indian restaurant in Dallas) on a travel platform P10 in the past through a communication device D10 using internet.

The user segmentation system 304 obtains a third set of data associated with a plurality of live events of the plurality of users 202 on the plurality of webpages of the one or more online platforms 102. The third set of data corresponds the plurality of live events of the plurality of users 202 on the granular level. In an example, the plurality of live events includes but may not be limited to real-time uniform resource locater visits, real-time number of webpage visits, and real-time number of webpages accessed. In another example, the plurality of live events includes but may not be limited to real-time webpage visit, real-time accessed content, real-time started content, real-time paused content, and real-time resumed content. In yet another example, the plurality of live events includes but may not be limited to real-time searched content, real-time notification clicks, real-time notification views, real-time products surfed, and real-time products added to cart. In yet another example, the plurality of live events includes but may not be limited to real-time reviews for products, real-time favorite product category, real-time inactivity for products, and real-time accounts opened. In yet another example, the plurality of live events includes but may not be limited to real-time credit card requests, real-time credit cards issued, real-time loan requests, and real-time net-banking requests. In yet another example, the plurality of live events includes but may not be limited to real-time multimedia content surfed, real-time multimedia content watched, real-time texts exchanged, and real-time business blogs. In yet another example, the plurality of live events includes but may not be limited to real-time live media streamed, real-time audio-video callings, real-time medicines searched, and real-time medicines bought. In yet another example, the plurality of live events includes but may not be limited to real-time medical test kit bought, real-time medical tests scheduled, real-time bill payments, and real-time doctor consultation scheduled. In yet another example, the plurality of live events includes but may not be limited to real-time hospital visit planned, real-time dietary plan requested, real-time personal trainer hired, and real-time fitness center searched. In yet another example, the plurality of live events includes but may not be limited to real-time educational video searched, real-time educational video watched, and real-time projects submitted. In yet another example, the plurality of live events includes but may not be limited to real-time mock tests subscribed, real-time educational counselling requested, and real-time problem solving session requested. In yet another example, the plurality of live events includes but may not be limited to real-time international masters interests, real-time properties searched, real-time properties watched, and real-time properties bought. In yet another example, the plurality of live events includes but may not be limited to real-time rented properties searched, real-time maintenance services requested, and real-time hotel searched. In yet another example, the plurality of live events includes but may not be limited to real-time hotels added to watch-list, real-time hotel bookings, real-time holiday plans searched, and real-time holiday plans booked. In yet another example, the plurality of live events includes but may not be limited to real-time stock exchange investments, real-time money donated, real-time inactivity for product category, and real-time account created. In yet another example, the plurality of live events includes but may not be limited to real-time products bought, real-time repeated products, real-time subscriptions, and real-time subscription renewals. In yet another example, the plurality of live events includes but may not be limited to real-time subscription skipped, real-time initiated transactions, real-time failed transactions, and real-time content added to cart. In yet another example, the plurality of live events includes but may not be limited to real-time completed transactions, real-time most visited category, real-time content details watched, and real-time video on demand accessed. In yet another example, the plurality of live events includes but may not be limited to real-time video on demand initiated, and real-time video on demand searched.

In an embodiment of the present disclosure, the user segmentation system 304 accesses the third set of data from the over-the-top media platform 102A through the communication network 302. In another embodiment of the present disclosure, the user segmentation system 304 accesses the third set of data from the e-commerce platform 102B through the communication network 302. In yet another embodiment of the present disclosure, the user segmentation system 304 accesses the third set of data from the fintech platform 102C through the communication network 302. In yet another embodiment of the present disclosure, the user segmentation system 304 accesses the third set of data from the social media platform 102D through the communication network 302. In yet another embodiment of the present disclosure, the user segmentation system 304 accesses the third set of data from the health platform 102E through the communication network 302. In yet another embodiment of the present disclosure, the user segmentation system 304 accesses the third set of data from the education platform 102F through the communication network 302. In yet another embodiment of the present disclosure, the user segmentation system 304 accesses the third set of data from the real-estate and housing platform 102G through the communication network 302. In yet another embodiment of the present disclosure, the user segmentation system 304 accesses the third set of data from the travel platform 102H through the communication network 302.

In an embodiment of the present disclosure, the user segmentation system 304 obtains the plurality of live events performed on the over-the-top media platform 102A through the communication network 302. In addition, the plurality of live events performed on the over-the-top media platform 102A includes content watched in real-time, content paused in real-time, and content added to watch later in real-time. Further, the plurality of live events performed on the over-the-top media platform 102A includes subscriptions in real-time, subscription renewals in real-time, subscription transaction failures in real-time, content details viewed in real-time and the like. Furthermore, the plurality of live events performed on the over-the-top media platform 102A includes contents added to favorites in real-time, content skipped in real-time, subscription skipped in real-time, most visited category in real-time, and the like.

In an example, users U1 watch content C1 (let's say comic anime) on an OTT platform P1 in real-time through a communication device D1 (let's say smartphones) using internet. In another example, users U2 pause content C2 (let's say horror movie) on an OTT platform P2 in the real-time through a communication device D2 using internet. In yet another example, users U3 add content C3 (let's say a documentary) to a watch later list W1 on an OTT platform P3 in the real-time through a communication device D3 (let's say desktop computers) using internet. In yet another example, users U4 subscribe for accessing an OTT platform P4 in the real-time through a communication device D4 using internet. In yet another example, users U5 renew subscription for accessing an OTT platform P5 in the real-time through a communication device D5 (let's say tablets) using internet. In yet another example, users U6 fail subscription transactions on an OTT platform P6 for accessing various contents in the real-time through a communication device D6 using internet. In yet another example, users U7 watch description of content C7 (let's say stand-up comedy show) on an OTT platform P7 in the real-time through a communication device D7 (let's say laptops) using internet. In yet another example, users U8 click notification N8 on an OTT platform P8 while accessing content C8 in the real-time through a communication device D8 using internet.

In an embodiment of the present disclosure, the user segmentation system 304 obtains the plurality of live events performed on the e-commerce platform 102B through the communication network 302. In addition, the plurality of live events performed on the e-commerce platform 102B includes products surfed in real-time, products added to cart in real-time, account created in real-time, products bought in real-time, repeated products in real-time and the like. Further, the plurality of live events performed on the e-commerce platform 102B includes transactions initiated in real-time, transactions completed in real-time, transactions failed in real-time, notification clicks in real-time and the like. Furthermore, the plurality of live events performed on the e-commerce platform 102B includes reviews for products in real-time, product category visits in real-time, inactivity for products in real-time, inactivity for product category in real-time, and the like.

In an example, users U1 surf a product T1 (let's say sport shoes) on an e-commerce platform P1 in real-time through a communication device D1 (let's say smartphones) using internet. In another example, users U2 add a product T2 (let's say a smartphone) to a cart on an e-commerce platform P2 in the real-time through a communication device D2 using internet. In yet another example, users U3 create online account A3 to buy a product T3 (let's say a washing machine) on an e-commerce platform P3 in the past through a communication device D3 (let's say desktop computers) using internet. In yet another example, users U4 buy a product T4 (let's say a smartwatch) while accessing an e-commerce platform P4 in the real-time through a communication device D4 using internet. In yet another example, users U5 repeatedly buy a product T5 (let's say a formal trouser) on an e-commerce platform P5 in the real-time through a communication device D5 (let's say tablets) using internet. In yet another example, users U6 initiate payment transaction 16 for a product T6 (let's say a non-fiction book) on an e-commerce platform P6 in the real-time through a communication device D6 using internet. In yet another example, users U7 completes payment transaction C7 for a product T7 (let's say a Bluetooth speaker) on an e-commerce platform P7 in the real-time through a communication device D7 (let's say laptops) using internet. In yet another example, users U8 leave payment transaction L8 for a product T8 (let's say a mattress) on an e-commerce platform P8 in the real-time through a communication device D8 using internet. In yet another example, users U9 review a product T9 (let's say a play station) on an e-commerce platform P9 in the real-time through a communication device D9 using internet.

In an embodiment of the present disclosure, the user segmentation system 304 obtains the plurality of live events performed on the fintech platform 102C through the communication network 302. In addition, the plurality of live events performed on the fintech platform 102C includes accounts opened in real-time, credit card requests in real-time, credit cards issued in real-time, loan requests in real-time, net-banking requests in real-time and the like. Further, the plurality of live events performed on the fintech platform 102C includes bill payments in real-time, stock exchange investments in real-time, money donated in real-time, notifications clicked in real-time, and the like. Furthermore, the plurality of live events performed on the fintech platform 102C includes transaction initiated in real-time, transaction failed in real-time, transaction left in real-time, transaction completed in real-time, and the like.

In an example, users U1 open an account A1 (let's say a saving account) on a fintech platform P1 in the real-time through a communication device D1 (let's say smartphones) using internet. In another example, users U2 request for a credit card C2 on a fintech platform P2 in the real-time through a communication device D2 using internet. In yet another example, users U3 request for loan L3 (let's say a home loan) on a fintech platform P3 in the real-time through a communication device D3 (let's desktop computers) using internet. In yet another example, users U4 request to start net-banking service on a fintech platform P4 in the real-time through a communication device D4 using internet. In yet another example, users U5 pay a bill B5 (let's say a broadband bill) through a fintech platform P5 in the real-time through a communication device D5 (let's say tablets) using internet. In yet another example, users U6 invest money in stock exchange S6 on a fintech platform P6 in the real-time through a communication device D6 using internet. In yet another example, users U7 donate money for social, disaster, environment and economical campaigns S7 (let's say a donation for Tsunami victims) on a fintech platform P7 in the real-time through a communication device D7 (let's say laptops) using internet. In yet another example, users U8 click a notification N8 on a fintech platform P8 in the real-time through a communication device D8 using internet. In yet another example, users U9 initiate transaction T9 (let's say $50) for credit card payments on a fintech platform P9 in the real-time through a communication device D9 using internet. In yet another example, users U10 complete transaction T10 (let's say $100) fora grocery store G10 on a fintech platform P10 in the real-time through a communication device D10 using internet.

In an embodiment of the present disclosure, the user segmentation system 304 obtains the plurality of live events performed on the social media platform 102D through the communication network 302. In addition, the plurality of live events performed on the social media platform 102D includes multimedia content surfed in real-time, multimedia content watched in real-time, and account created in real-time. Further, the plurality of live events performed on the social media platform 102D includes texts exchanged in real-time, business blogs accessed in real-time, paid promotions in real-time, and the like. Furthermore, the plurality of live events performed on the social media platform 102D includes services activated in real-time, live media streamed in real-time, audio-video callings in real-time, and the like.

In an example, users U1 surf a multimedia content M1 (let's say an animation cartoon) on a social media platform P1 in the real-time through a communication device D1 (let's say smartphones) using internet. In another example, users U2 watch a multimedia content M2 (let's say an action movie teaser) on a social media platform P2 in the real-time through a communication device D2 using internet. In yet another example, users U3 create an online account on a social media platform P3 in the real-time through a communication device D3 (let's say laptops) using internet. In yet another example, users U4 exchange a text message T4 (let's say a promotional text message) on a social media platform P4 in the real-time through a communication device D4 using internet. In yet another example, users U5 write a business blog B5 (let's say a grooming product business blog) through a social media platform P5 in the real-time through a communication device D5 (let's say desktop computers) using internet. In yet another example, users U6 request for a paid promotion (let's say a paid promotion for clothing page) on a social media platform P6 in the real-time through a communication device D6 using internet. In yet another example, users U7 stream a live video L7 (let's say a live stream of a baseball match) on a social media platform P7 in the real-time through a communication device D7 (let's say tablets) using internet. In yet another example, users U8 click a notification N8 on a social media platform P8 in the real-time through a communication device D8 using internet.

In an embodiment of the present disclosure, the user segmentation system 304 obtains the plurality of live events performed on the health platform 102E through the communication network 302. In addition, the plurality of live events performed on the health platform 102E includes medicines searched in real-time, medicines bought in real-time, medical test kit bought in real-time, and the like. Further, the plurality of live events performed on the health platform 102E includes medical tests scheduled in real-time, transaction initiated in real-time, transaction completed in real-time, and the like. Furthermore, the plurality of live events performed on the health platform 102E includes doctor consultation scheduled in real-time, hospital visit planned in real-time, and the like. Moreover, the plurality of live events performed on the health platform 102E includes dietary plan requested in real-time, personal trainer hired in real-time, fitness center searched in real-time and the like.

In an example, users U1 search a medicine M1 (let's say a diabetes medicine) on a health platform P1 in the real-time through a communication device D1 (let's say desktop computers) using internet. In another example, users U2 buy a medicine M2 (let's say a blood pressure medicine) on a health platform P2 in the real-time through a communication device D2 using internet. In yet another example, users U3 buy a medical kit M3 (let's say a sugar level test kit) on a health platform P3 in the real-time through a communication device D3 (let's say smartphones) using internet. In yet another example, users U4 schedule a medical test T4 (let's say a pregnancy test) on a health platform P4 in the real-time through a communication device D4 using internet. In yet another example, users U5 initiate a transaction T5 (let's say $10) for buying a medicine M5 on a health platform P5 in the real-time through a communication device D5 (let's say tablets) using internet. In yet another example, users U6 complete a transaction T6 (let's say a $50) for medical kit M6 on a health platform P6 in the real-time through a communication device D6 using internet. In yet another example, users U7 schedule a consultation with a doctor D7 (let's say a cardiologist) on a health platform P7 in the real-time through a communication device D7 using internet. In yet another example, users U8 request a dietary plan M8 (let's a weight loss diet plan) on a health platform P8 in the real-time through a communication device D8 (let's say laptops) using internet. In yet another example, users U9 hire a personal trainer T9 (let's an aerobics instructor) on a health platform P9 in the real-time through a communication device D9 using internet.

In an embodiment of the present disclosure, the user segmentation system 304 obtains the plurality of live events performed on the education platform 102F through the communication network 302. In addition, the plurality of live events performed on the education platform 102F includes educational video searched in real-time, educational video watched in real-time, projects submitted in real-time, and the like. Further, the plurality of live events performed on the education platform 102F includes account created in real-time, and the like. Furthermore, the plurality of live events performed on the education platform 102F includes transaction initiated in real-time, transaction failures in real-time, transaction completed in real-time, and the like. Moreover, the plurality of live events performed on the education platform 102F includes notification clicked in real-time, mock tests subscribed in real-time, educational counselling requested in real-time, and the like. Also, the plurality of live events performed on the education platform 102F includes problem solving session requested in real-time, international masters searched in real-time, and the like.

In an example, users U1 search an educational video E1 (let's say an educational video on trigonometry) on an education platform P1 in the real-time through a communication device D1 (let's say laptops) using internet. In another example, users U2 watch an educational video E2 (let's say an educational video on Anatomy) on an education platform P2 in the real-time through a communication device D2 (let's say tablets) using internet. In yet another example, users U3 submit an educational project E3 (let's say an educational solar project) on an education platform P3 in the real-time through a communication device D3 using internet. In yet another example, users U4 create an account A4 on an education platform P4 in the real-time through a communication device D4 using internet. In yet another example, users U5 initiate a transaction T5 (let's say $10) for buying a zoology book Z5 on an education platform P5 in the real-time through a communication device D5 (let's say desktop computers) using internet. In yet another example, users U6 complete a transaction T6 (let's say a $50) for a business communication skills lectures B6 on an education platform P6 in the real-time through a communication device D6 using internet. In yet another example, users U7 click a notification N7 on an education platform P7 in the real-time through a communication device D7 using internet. In yet another example, users U8 subscribe for a mock test M8 (let's a mock test for geography subject) on an education platform P8 in the real-time through a communication device D8 (let's say smartphones) using internet. In yet another example, users U9 request a problem solving session S9 (let's a problem solving session with an Integration expert) on an education platform P9 in the real-time through a communication device D9 using internet.

In an embodiment of the present disclosure, the user segmentation system 304 obtains the plurality of live events performed on the real estate and housing platform 102G through the communication network 302. In addition, the plurality of live events performed on the real estate and housing platform 102G includes properties searched in real-time, properties watched in real-time, properties bought in real-time, and the like. Further, the plurality of live events performed on the real estate and housing platform 102G includes rented properties in real-time, maintenance services requested in real-time, and the like. Furthermore, the plurality of live events performed on the real estate and housing platform 102G includes transaction initiated in real-time, account created in real-time, transaction completed in real-time, and the like.

In an example, users U1 search a property E1 (let's say an apartment in California) on a real estate and housing platform P1 in the real-time through a communication device D1 (let's say tablets) using internet. In another example, users U2 watch a property E2 (let's say a home in Alaska) on a real estate and housing platform P2 in the real-time through a communication device D2 using internet. In yet another example, users U3 buy a property E3 (let's say a commercial property in New York) on a real estate and housing platform P3 in the real-time through a communication device D3 (let's say desktop computers) using internet. In yet another example, users U4 create an account A4 on a real estate and housing platform P4 in the real-time through a communication device D4 using internet. In yet another example, users U5 initiate a transaction T5 (let's say $15000) on a real estate and housing platform P5 in the real-time through a communication device D5 using internet. In yet another example, users U6 complete a transaction T6 (let's say a $5000) on a real estate and housing platform P6 in the real-time through a communication device D6 (let's say laptops) using internet. In yet another example, users U7 click a notification N7 (let's say a notification suggesting apartments in Chicago) on a real estate and housing platform P7 in the real-time through a communication device D7 using internet. In yet another example, users U8 request a maintenance service M8 (let's maintenance of electronic elements) on a real estate and housing platform P8 in the real-time through a communication device D8 (let's say smartphones) using internet.

In an embodiment of the present disclosure, the user segmentation system 304 obtains the plurality of live events performed on the travel platform 102H through the communication network 302. In addition, the plurality of live events performed on the travel platform 102H includes hotel searched in real-time, hotels added to watch-list in real-time, hotel bookings in real-time, and the like. Further, the plurality of live events performed on the travel platform 102H includes account created in real-time, holiday plans searched in real-time, holiday plans booked in real-time, and the like. Furthermore, the plurality of live events performed on the travel platform 102H includes transaction initiated in real-time, transaction completed in real-time, restaurant pre-booked in real-time, and the like.

In an example, users U1 search a hotel H1 (let's say a hotel in San Francisco) on a travel P1 in the real-time through a communication device D1 (let's say smartphones) using internet. In another example, users U2 add a hotel H2 (let's say a hotel in Seattle) to a watch-list W2 on a travel platform P2 in the real-time through a communication device D2 (let's say tablets) using internet. In yet another example, users U3 book a hotel H3 (let's say a hotel in San Jose) on a travel platform P3 in the real-time through a communication device D3 using internet. In yet another example, users U4 create an account A4 on a travel platform P4 in the real-time through a communication device D4 using internet. In yet another example, users U5 search a holiday plan H5 (let's say a holiday plan to Maldives for 5 days 4 nights) on a travel platform P5 in the real-time through a communication device D5 using internet. In yet another example, users U6 book a holiday plan H6 (let's say a holiday plan to Cairo for 4 days 5 nights) on a travel platform P6 in the real-time through a communication device D6 (let's say desktop computers) using internet. In yet another example, users U7 initiate a transaction T7 (let's say $150) on a travel platform P7 in the real-time through a communication device D7 using internet. In yet another example, users U8 complete a transaction T8 (let's say a $500) on a travel platform P8 in the real-time through a communication device D8 (let's say laptops) using internet. In yet another example, users U9 click a notification N9 (let's say a notification suggesting Holiday plans for Switzerland) on a travel platform P9 in the real-time through a communication device D9 using internet. In yet another example, users U10 pre-book a restaurant R10 (let's an Indian restaurant in Dallas) on a travel platform P10 in the real-time through a communication device D10 using internet.

In an embodiment of the present disclosure, the plurality of users 202 visits the plurality of webpages of the over-the-top media platform 102A through the one or more communication devices 204 in real-time. In another embodiment of the present disclosure, the plurality of users 202 visits the plurality of webpages of the e-commerce platform 102B through the one or more communication devices 204 in real-time. In yet another embodiment of the present disclosure, the plurality of users 202 visits the plurality of webpages of the fintech platform 102C through the one or more communication devices 204 in real-time. In yet another embodiment of the present disclosure, the plurality of users 202 visits the plurality of webpages of the social media platform 102D through the one or more communication devices 204 in real-time. In yet another embodiment of the present disclosure, the plurality of users 202 visits the plurality of webpages of the health platform 102E through the one or more communication devices 204 in real-time. In yet another embodiment of the present disclosure, the plurality of users 202 visits the plurality of webpages of the education platform 102F through the one or more communication devices 204 in real-time. In yet another embodiment of the present disclosure, the plurality of users 202 visits the plurality of webpages of the real estate and housing platform 102G through the one or more communication devices 204 in real-time. In yet another embodiment of the present disclosure, the plurality of users 202 visits the plurality of webpages of the travel platform 102H through the one or more communication devices 204 in real-time.

In an example, users U1 search a video on demand V1 (let's say an epic drama movie) on a webpage W1 of an OTT platform O1 in the real-time through a communication device D1 (let's say smartphones). In another example, users U2 buy an electronic device E2 (let's say an electronic trimmer) on a webpage W2 of an e-commerce platform C2 in the real-time through a communication device D2 (let's say laptop). In yet another example, users U3 make an online transaction O3 (let's say a transaction for electricity bill) on a webpage W3 of a fintech platform F3 in the real-time through a communication device D3 (let's say a desktop computer). In yet another example, users U4 create an account A4 on a webpage W4 of a social media platform S4 in the real-time through a communication device D4 (let's say a tablet). In yet another example, users U5 buy a medicine M5 (let's say an antiseptic cream) on a webpage W5 of a health platform H5 in the real-time through a communication device D5 (let's say a laptop). In yet another example, users U6 add an e-book B6 (let's say an anthology book) in cart on a webpage W6 of an education platform E6 in the real-time through a communication device D6 (let's say desktop computers). In yet another example, users U7 initiate a transaction T7 (let's say $150 for house rent) on a webpage W7 of a real estate and housing platform R7 in the real-time through a communication device D7 (let's say smartphone). In yet another example, users U8 complete a transaction T8 (let's say a $50 for a hotel booking) on a webpage W8 of a travel platform H8 in the real-time through a communication device D8 (let's say laptops)

The user segmentation system 304 analyzes the first set of data, the second set of data and the third set of data using one or more machine learning algorithms. In an embodiment of the present disclosure, the one or more machine learning algorithms include a decision tree algorithm and a random forest algorithm. In another embodiment of the present disclosure, the one or more machine learning algorithms include but may not be limited to prediction algorithms, deep learning algorithms, natural language processing algorithm and the like. However, the one or more machine learning algorithms are not limited to the above-mentioned algorithms. The analysis of the first set of data, the second set of data, and the third set of data based on the one or more machine learning algorithms is done in real-time. In addition, the user segmentation system 304 creates a machine learning model to perform analysis of the first set of data, the second set of data, and the third set of data. The machine learning model is trained to identify one or more patterns from the first set of data, the second set of data, and the third set of data. Further, the one or more patterns include uniform resource locater visit pattern, webpage visit pattern, number of webpage accessed pattern, accessed content pattern, started content pattern, paused content pattern, and the like. Furthermore, the one or more patterns include resumed content pattern, searched content pattern, notification click pattern, notification views pattern, products surfed pattern, products added to cart pattern, and the like. Moreover, the one or more patterns include reviews for products pattern, favorite product category pattern, inactivity for products pattern, accounts opened pattern, credit card requests pattern, and the like. Also, the one or more patterns include credit cards issued pattern, loan request patterns, net-banking requests pattern, multimedia content surfed pattern, multimedia content watched pattern, and the like. Also, the one or more patterns include texts exchanged pattern, business blogs pattern, live media streamed pattern, audio-video calling pattern, medicines searched pattern, medicines bought pattern, and the like. Also, the one or more patterns include medical test kit bought pattern, medical tests scheduled pattern, bill payments pattern, doctor consultation scheduled pattern, hospital visit pattern, and the like. Also, the one or more patterns include dietary plan request pattern, personal trainer hired pattern, fitness center search pattern, educational video search pattern, educational video watched pattern, and the like. Also, the one or more patterns include projects submission pattern, mock tests subscription pattern, educational counselling request pattern, problem solving session request pattern, and the like. Also, the one or more patterns include international masters interests pattern, properties search pattern, properties watched pattern, properties bought pattern, rented properties search pattern, and the like. Also, the one or more patterns include maintenance services request pattern, hotel search pattern, hotels added to watchlist pattern, hotel bookings pattern, holiday plans search pattern, and the like. Also, the one or more patterns include holiday plans booked pattern, stock exchange investments pattern, money donated pattern, inactivity for product category pattern, account creation pattern, and the like. Also, the one or more patterns include products bought pattern, repeated products pattern, subscriptions pattern, subscription renewals pattern, subscription skipped pattern, initiated transactions pattern, and the like. Also, the one or more patterns include failed transactions pattern, content added to cart pattern, completed transactions pattern, most visited category pattern, content details watched pattern, and the like. Also, the one or more patterns include video on demand accessed pattern, video on demand initiated pattern, video on demand searched pattern, and the like.

The machine learning model is trained to analyze the first set of data, the second set of data, and the third set of data. Furthermore, the machine learning model is trained to identify the match of the one or more patterns of each of the plurality of users 202. In an embodiment of the present disclosure, the machine learning model is trained using supervised machine learning model. In another embodiment of the present disclosure, the machine learning model is trained using un-supervised machine learning model. Moreover, the machine learning model predicts behavior of each of the plurality of users 202 based on the one or more patterns, the second set of data and the third set of data. Also, the behavior of the plurality of users is predicted in real-time.

The user segmentation system 304 creates the one or more segments of the plurality of users 202 based on analysis performed on the first set of data, the second set of data, and the third set of data using a plurality of filters. In addition, the plurality of filters is used to create the one or more segments on the granular level. Further, the plurality of filters includes time based filters, days based filters, age based filters, location based filters, events based filters, inactivity based filters, and the like. Further, the plurality of filters includes user properties filters, demographic filters, geographic filters, technographic filters, application field filters and the like. However, the plurality of filters is not limited to the above-mentioned filters.

In addition, the plurality of filters is selected from a webpage category. The webpage category displays the plurality of filters for the granular level segmentation of the plurality of users 202 in real-time. The webpage category includes a plurality of sub-categories. The plurality of sub-categories includes a page visit sub-category, a page count sub-category, a referrer entry sub-category and the like. In addition, the page visit sub-category is used for creating the one or more segments of the plurality of users 202 when the plurality of webpages is visited. Further, the page count sub-category is used for numbers of webpage visits for the plurality of webpages of the one or more online platforms 102. Furthermore, the referrer entry sub-category is used for referred webpages of the plurality of webpages.

In an example, the user properties include activation date, birthday, e-mail identity, customer type, preferred language, preferred genre, postal code, and the like. In an example, the demographic filters include age based filters, gender based filters and the like. In an example, the geographic filters include continents based filters, countries based filters, states based filters, cities based filters, villages based filters and the like. The technographic filters include the plurality of web browsers, the one or more communication devices 204, the operating system, and the like. Furthermore, the plurality of filters is based on one or more parameters. The one or more parameters include day, time, language, location, events, inactivity, online platform and the like.

In an embodiment of the present disclosure, the one or more segments of the plurality of users 202 are created based on at least one filter of the plurality of filters. The one or more segments are created in real-time. Furthermore, the one or more segments of the plurality of the users 202 are created based on the one or more patterns on the granular level. Moreover, the one or more segments are created using each of the one or more patterns of corresponding user of the plurality of users 202. Moreover, the each of the one or more patterns of corresponding user of the plurality of users 202 are analyzed using the one or more machine learning algorithms.

In an embodiment of the present disclosure, the one or more segments of the plurality of users 202 are created based on the time based filters. In another embodiment of the present disclosure, the one or more segments of the plurality of users 202 are created based on the days based filters. In yet another embodiment of the present disclosure, the one or more segments of the plurality of users 202 are created based on the age based filters. In yet another embodiment of the present disclosure, the one or more segments of the plurality of users 202 are created based on the location based filters. In yet another embodiment of the present disclosure, the one or more segments of the plurality of users 202 are created based on the events based filters. In yet another embodiment of the present disclosure, the one or more segments of the plurality of users 202 are created based on the inactivity based filters.

In an example, segment S1 is created for users U1 performing actions A1 (let's say notification click) on an online platform P1 (let's say social media platform) on communication devices D1 (let's say laptop) using a filter F1 (let's say time filter). In another example, segment S2 is created for users U2 performing actions A2 (let's say webpage launched) on an online platform P2 (let's say over-the-top platform) on communication devices D2 (let's say smartphone) using a filter F2 (let's say location filter) in a category C2 (let's say page count category). In yet another example, segment S3 is created for users U3 performing actions A3 (let's say wrist watch added to watchlist) on an online platform P3 (let's say e-commerce platform) on communication devices D3 (let's say desktop) using a filter F3 (let's say frequency filter) in a category C3 (let's say page visit sub-category). In yet another example, segment S4 is created for users U4 performing actions A4 (let's say paused a genetics lecture and inaction) on an online platform P4 (let's say education platform) on communication devices D4 (let's say tablet) using a filter F4 (let's say inactivity filter) in a category C4 (let's say referrer entry sub-category). In yet another example, segment S5 is created for users U5 performing actions A5 (let's say transaction initiated) on an online platform P5 (let's say fintech platform) on communication devices D5 (let's say laptop) using a filter F5 (let's say activities filter) in a category C5 (let's say page visit sub-category).

The user segmentation system 304 creates a segment trend plot for each of the one or more segments. In addition, the segment trend plot is in one or more forms. Further, the one or more forms include but not limited to bar graph, histogram, pictogram, pie graph, line graph, and cartesian graph. In an embodiment of the present disclosure, the segment trend plot corresponds to the line graph. In another embodiment of the present disclosure, the segment trend plot corresponds to the bar graph. In yet another embodiment of the present disclosure, the segment trend plot corresponds to the cartesian graph. In yet another embodiment of the present disclosure the segment trend plot corresponds to the pie graph. Furthermore, the segment trend plot is downloaded in one or more formats, wherein the one or more formats include chart, joint photographic experts group, portable network graphics, portable document format, scalable vector graphics, and comma-separated values. In an embodiment of the present disclosure, the segment trend plot is downloaded in the joint photographic experts group format. In another embodiment of the present disclosure, the segment trend plot is downloaded in the portable network graphics format. In yet another embodiment of present disclosure, the segment trend plot is downloaded in the portable document format.

The user segmentation system 304 triggers initialization of the one or more marketing campaigns for the one or more segments. In addition, the one or more marketing campaigns are initiated based on the one or more patterns of the one or more segments using the plurality of filters. The one or more marketing campaigns are initiated for the one or more segments by a plurality of advertisers. Further, the plurality of advertisers purchases one or more advertisement slots from the one or more online platforms 102. In an embodiment of the present disclosure, the plurality of advertisers purchases the one or more advertisement slots for displaying one or more advertisements on the corresponding advertisement slots.

In general, the one or more marketing campaigns are organized, strategized efforts for marketing to the plurality of users 202. The one or more marketing campaigns reach the plurality of users 202 in a plurality of channels. The plurality of channels include but may not be limited to mobile channels, email channels, desktop channels, social channels, remarketing channels, server channels, and the like. However, the various channels are not limited to the above-mentioned channels. The one or more marketing campaigns may include an advertiser defined parameters. The advertiser defined parameters include minimum spend, discounts, campaign duration, campaign relevancy, campaign location, a customer's patronage of the one or more online platforms 102, user interaction, and the like. However, the advertiser defined parameters are not limited to the above-mentioned parameters.

In an embodiment of the present disclosure, the one or more marketing campaigns have an acquisition objective designed to send offers to new users of the plurality of users 202 that have not sufficiently patronized the one or more online platforms 102. In another embodiment of the present disclosure, the one or more marketing campaigns have a loyalty campaign designed to send offers to former users of the plurality of users 202 that have sufficiently patronized the one or more of online platforms 102. In yet another embodiment of the present disclosure, the one or more marketing campaigns have an all-inclusive campaign are designed to send offers to both new and former users. In an example, a marketing campaign M1 with an all-inclusive objective O1 has a discount value from 10% to 40%. In another example, a marketing campaign M2 with a loyalty objective O2 has a discount value from 20% to 50% (wherein 25% discount value is a default). In yet another example, a marketing campaign M3 with an acquisition objective O3 has a discount value from 40% to 60% (wherein 25% discount value is a default).

The user segmentation system 304 displays the one or more advertisements to the plurality of users 202 on a corresponding advertisement slot of the one or more advertisement slots. The one or more advertisements associated with the one or more marketing campaigns. In an embodiment of the present disclosure, the one or more advertisements are displayed on the one or more communication devices 204 in the form of flash messages. In another embodiment of the present disclosure, the one or more advertisements are displayed on the one or more communication devices 204 in the form of text messages. In yet another embodiment of the present disclosure, the one or more advertisements are displayed on the one or more communication devices 204 in the form of telephonic calls. In yet another embodiment of the present disclosure, the one or more advertisements are displayed on the one or more communication devices 204 in the form of multimedia messages. In yet another embodiment of the present disclosure, the one or more advertisements are displayed on the one or more online platforms 102 in the form of notification. In yet another embodiment of the present disclosure, the one or more advertisements are displayed on the one or more communication devices 204 as Google Ads. The one or more advertisements are displayed on the one or more communication devices 204 in real-time. In an embodiment of the present disclosure, the one or more advertisements displayed are associated with the interests of the user of the plurality of users 202. In addition, the one or more advertisements include text advertisements, video advertisements, audio advertisements, audio-video advertisements, pictorial advertisements, and the like.

The interactive computing environment 300 further includes the server 306 and the database 306a. The user segmentation system 304 is associated with the server 306. In general, server is a computer program or device that provides functionality for other programs or devices. The server 306 provides various functionalities, such as sharing data or resources among multiple clients, or performing computation for a client. However, those skilled in the art would appreciate that the user segmentation system 304 is connected to more number of servers. Furthermore, it may be noted that the server 306 includes the database 306a. However, those skilled in the art would appreciate that more number of the servers include more numbers of database.

In an embodiment of the present disclosure, the user segmentation system 304 is located in the server 306. In another embodiment of the present disclosure, the user segmentation system 304 is connected with the server 306. In yet another embodiment of the present disclosure, the user segmentation system 304 is a part of the server 306. The server 306 handles each operation and task performed by the user segmentation system 304. The server 306 stores one or more instructions for performing the various operations of the user segmentation system 304. The server 306 is located remotely from the one or more online platforms 102. The server 306 is associated with the administrator 308. In general, the administrator 308 manages the different components in the user segmentation system 304. The administrator 308 coordinates the activities of the components involved in the user segmentation system 304. The administrator 308 is any person or individual who monitors the working of the user segmentation system 304 and the server 306 in real-time. The administrator 308 monitors the working of the user segmentation system 304 and the server 306 through a communication device. The communication device includes the laptop, the desktop computer, the tablet, a personal digital assistant and the like.

The database 306a stores different sets of information associated with various components of the user segmentation system 304. In general, the database is used to hold general information and specialized data, such as characteristics data of the plurality of users 202, data of the one or more communication devices 204, data of the one or more online platforms 102 and the like. The database 306a stores the information of the one or more online platforms 102, the one or more communication devices 204, the profiles of the plurality of users 202, demographic information of the plurality of users 202 and the like. The database 306a organizes the data using model such as relational models or hierarchical models. Further, the database 306a store data provided by the administrator 308.

FIG. 4 illustrates an example 400 of segmentation of the plurality of users 202 for a "page visit" sub-category in real-time, in accordance with various embodiments of the present disclosure. The example 400 demonstrates creation of new segment for the plurality of users 202 in the sub-category "page visit" in the "live user segment". In the example 400, the user visits a page uniform resource locator that contains "www.OTT1.com". In the example 400, the segmentation of the users is done with the "filter on past user behavior". In the example 400, the users are qualified for the new segment after starting the content for the first time in the last 30 days. In another example, the user visits a page uniform resource locator that contains "www.OTT2.com" first time in real-time in the last 10 days in the sub-category "page visit".

FIG. 5 illustrates an example 500 of a plurality of uniform resource locator filters for the "page visit" sub-category for segmentation of the plurality of users 202 in real-time, in accordance with various embodiments of the present disclosure. The example 500 demonstrates creation of new segment for the plurality of users 202 in the sub-category "page visit" in the "live user segments" using the plurality of uniform resource locator filters. In the example 500, the plurality of uniform resource locator filters includes "contains", "does not contains", "equals", "not equals", "matches regex", and "does not match regex". In the example 500, the segmentation of the plurality of users 202 vising the page uniform resource locator "www.OTT1.com" is done using "contains" filter of the plurality of uniform resource locator filters in real-time. In another example, segmentation of the plurality of users 202 vising the page uniform resource locator "www.OTT2.com" is done using "does not contains" filter of the plurality of uniform resource locator filters in real-time.

FIG. 6 illustrates an example 600 of segmentation of the plurality of users 202 for a "referrer entry" sub-category in real-time, in accordance with various embodiments of the present disclosure. The example 600 demonstrates creation of new segment for the plurality of users 202 in the sub-category "referrer entry" in the "live user segments" based on referred page uniform reform locator. In the example 600, the user visits a page uniform resource locator via a referrer that "does not contains" "www.OTT5.com" in real-time in the sub-category "page visit". In the example 600, the users are qualified for the new segment after visiting the page uniform resource locator via the referrer that "does not contains" "www.OTT5.com" in real-time.

FIG. 7 illustrates an example 700 of segmentation of the plurality of users 202 for a "page count" sub-category in real-time, in accordance with various embodiments of the present disclosure. The example 700 demonstrates creation of new segment for the plurality of users 202 in the sub-category "page count" in the "live user segments" based on number of pages visited in a session. In the example 700, the users are qualified for the new segment when the page count in the session exceeds 10. In the example 700, "past user behavior" filter is used for the users who clicked notification for the first time in the last 30 days.

FIG. 8 illustrates an example 800 of the "segment trend plot", in accordance with various embodiments of the present disclosure. The example 800 demonstrates the "segment trend plot". The "segment trend plot" is a dynamic segment plot. The "segment trend plot" is created for analysis of number of the plurality of users 202 with the time parameter in real-time. The time parameter includes today, number of days, before certain date, after certain date, on certain date, between two specific dates, and the like. In the example 800, a segment trend plot P1 is created for number of users N1 (roughly estimated range from 3125 to 3120 numbers of users) during a specified time parameter T1 (as shown between Jul. 8, 2019 and Aug. 6, 2019). In another example, a segment trend plot P2 is created for number of users N2 (let's say ranging from 10000 to 20000) during a specified time parameter T2 (let's say in past 45 days).

FIG. 9 illustrates an example 900 for downloading the "segment trend plot" in the one or more formats, in accordance with various embodiments of the present disclosure. The example 900 demonstrates the one or more formats for downloading the "segment trend plot". In an example 900, the segment trend plot P1 is downloaded in the one or more formats (as shown in FIG. 9 PNG, JPEG, PDF, SVG and CSV). In an example 900, the segment plot P1 may be directly printed through an external hardware output device D1 (let's say an inkjet printer).

FIG. 10 illustrates an example 1000 for selecting the plurality of channels for initiating a marketing campaign, in accordance with various embodiments of the present disclosure. The example 1000 depicts various mediums and "channels" for a specific marketing campaign from the one or more marketing campaigns. In the example 1000, the plurality of channels includes the "mobile channels", the "email channels", the "desktop/mobile web channels", the "social channels", the "remarketing channels", and the "server channels". Further, the "mobile channels" include "mobile push", "SMS", and "application inbox". Furthermore, the "remarketing channels" include "audiences" and "google ads". In the example 1000, the "social channels" includes "WhatsApp". In another example, the "social channels" includes Facebook, Skype, Google Hangouts, Microsoft Teams, Slack, Business Chat, Telegram, and the like. In the example 1000, at least one of the channel is selected from the plurality of channels for the specific marketing campaign.

FIG. 11 illustrates an example 1100 for engaging the marketing campaign using a "mobile push" channel, in accordance with various embodiments of the present disclosure. The example 1100 depicts a section entitled "when" to engage the marketing campaign using the "mobile push" channel. In the example 1100, the section entitled "when" of the "mobile push" channel includes a "message type", a "campaign start date and time", a "time zone", and a "campaign do not disturb". In the example 1100, the "message type" is "one time" message. In another example, the "message type" is "multiple dates" and "recurring". In the example 1100, the "campaign start date and time" is "now". In another example, the "campaign start date and time" is "later". In the example 1100, the "time zone" is selected as "deliver in user's time zone" using the filter "drop the campaign" if the specific campaign start time is after the user's local time. In another example, the "time zone" is selected as "deliver in user's time zone" using the filter "deliver the campaigns the next day". In the example 1100, the "campaign do not disturb" for the specific campaign of the one or more marketing campaigns allows to not deliver messages between 10:00 PM to 06:000 AM using the filter "discard messages scheduled during do not disturb hours". In another example, the "campaign do not disturb" for the specific campaign of the one or more marketing campaigns allows to use the filter "delay delivery until the end of the do not disturb hours".

FIG. 12 illustrates an example 1200 of a campaign delivery and a campaign reach, in accordance with various embodiments of the present disclosure. The example 1200 depicts a section entitled "who" to engage the marketing campaign using the "mobile push" channel. In the example 1200, the section entitled "who" includes "restrict delivery to" and the "campaign reach". In the example 1200, the subsection "restrict delivery to" includes an "operating system" and a "device". In addition, the "operating system" includes "iOS" and "Android". Further, the "device" includes "mobile", "tablet", and "television". In the example 1200, subsection "campaign reach" includes "current segment size". In the example 1200, total number of users in the current segment is 3,046. In the example 1200, the number of users using the android in the current segment is 1,082. In the example 1200, the number of users using the iOS in the current segment is 1,964. In addition, the example 1200 shows that the segment size may vary at the time of campaign run. In the example 1200, a first filter for sending the campaign is "all the users who qualify at the time of campaign run". In another example, a second filter is "don't send campaign if the segment size exceeds" 10,000 users.

FIG. 13 illustrates an example 1300 for sending message for the marketing campaign, in accordance with various embodiments of the present disclosure. The example 1300 depicts a section entitled "what" to send while engaging with the marketing campaign. In the example 1300, the section entitled "what" includes a "single message", an "A/B test", and a "message on user property". In addition, the "single message" is a same message sent to all the users in the target audience for the marketing campaign as shown in the example 1300. Further, the "A/B test" is used to send up to 3 message variants to a test group of the users to see which performs better for the marketing campaign. Furthermore, the "message on user property" is used to send localize messages based on user properties. In an example 1300, the "message on user property" is used to send the localize messages based on the user property preferred language. In another example, the "message on user property" is used to send the localize messages based on the user property location. In yet another example, the "message on user property" is used to send the localize messages based on the user property preferred genre. In yet another example, the "message on user property" is used to send the localize messages based on the user property birthday. In yet another example, the "message on user property" is used to send the localize messages based on the user property activation date.

FIG. 14 illustrates an example 1400 of the "single message" for the marketing campaign, in accordance with various embodiments of the present disclosure. The example 1400 depicts a section for creating the "single message" while engaging with the marketing campaign. In addition, the "single message" is created with a "title" and a "message" as shown in the example 1400. Further, the "single message" has an "advanced" filter. In the example 1400, the "advanced" filter includes rich media, custom key value pairs, sound media, badge count, deep link, and the like. In another example, the "advanced" filter includes a video media. In yet another example, the "advanced" filter includes a web banner. In the example 1400, the "single message" is created using customized setting for notification channel on Android version 8.0 and above.

FIG. 15 illustrates an example 1500 of the "A/B test" for the marketing campaign, in accordance with various embodiments of the present disclosure. The example 1500 depicts a section "A/B test" for creating various variant messages engaging with the marketing campaign. In addition, a message is created for "variant A" with a title A and a message A as shown in the example 1500. Further, a message is created for "variant B" with a title B and a message B. In the example 1500, more variant is added according to the requirement of the marketing campaign. In the example 1500, each of the variant messages has an "advanced" filter. In the example 1500, the "advanced" filter includes rich media, custom key value pairs, sound media, badge count, deep link, and the like. Furthermore, the "A/B test" helps to evaluate better performing message variant for the marketing campaign.

FIG. 16 illustrates an example 1600 of a "setup" for the marketing campaign, in accordance with various embodiments of the present disclosure. The example 1600 depicts a section entitled "setup" while engaging with the marketing campaign. In the example 1600, the "setup" includes "control groups" and "android push message time to live". In addition, the "control groups" include a "custom control group", a "campaign control group", and a "system control group". In the example 1600, the "custom control group"

selected is "Christmas campaign". In another example, the "custom control group" selected is "Easter campaign". In yet another example, the "custom control group" selected is "Aloha festival campaign". In yet another example, the "custom control group" selected is "Halloween campaign". Further, the "system control group" is automatically applied to the marketing campaign and measures effectiveness of the marketing campaign. Furthermore, the "android push message time to live" specifies for how long the message is preserved to be delivered to the plurality of users 202. In the example 1600, the "android push message time to live" is 12 hours. In the example 1600, "add labels" filter enables labelling of the marketing campaign with descriptive theme. In addition, the performance of each of the labels is also analyzed for the marketing campaign. In the example 1600, "post action webhook" filter enables the receiving of the notification data on the webhook. In the example 1600, "setup conversion tracking" filter enables tracking of conversion for the marketing campaign.

FIG. 17 illustrates an example 1700 of an "overview" for engagement of the marketing campaign, in accordance with various embodiments of the present disclosure. The example 1700 depicts a section entitled "overview" while engaging with the marketing campaign. In the example 1700, the "overview" displays the section entitled "when", the section entitled "who", the section entitled "what", and the section entitled "setup". In the example 1700, the section entitled "when" includes "campaign start date", "campaign end date and time", "delay", and "campaign do not disturb setting". In the example 1700, the marketing campaign starts now until stopped with no delay. In addition, the do not disturb setting is disabled for the marketing campaign. In another example, the section entitled "when" starts the marketing campaign in a form of a message now and discard the marketing campaign from 10:00 PM to 06:00 AM. In the example 1700, the section entitled "who" shows a trigger point for the marketing campaign when a user performs add to watch later. In another example, the section entitled "who" shows sending the message to the users who launched an application in the last 30 days. In addition, the section entitled "who" shows sending the message to Mobile, Tablet, and TV. In the example 1700, the section entitled "what" shows sending the message titled "Christmas Festive Sale" for "Apple Smartwatch at just $1,499". In the example 1700, the section entitled "setup" shows the "custom control group" selected as "Christmas Campaign" and the "system control group" selected as 5%. In another example, the section entitled "setup" shows the "custom control group" selected as "Halloween Campaign".

FIGS. 18A and 18B illustrate a flow chart 1800 of the method for segmentation of the plurality of users 202 in real-time, in accordance with various embodiments of the present disclosure. It may be noted that in order to explain the method steps of the flowchart 1800, references will be made to the elements explained in FIG. 3. The flow chart 1800 starts at step 402. At step 404, the user segmentation system 304 receives the first set of data associated with the plurality of users 202. At step 406, the user segmentation system 304 fetches the second set of data associated with the plurality of past events of the plurality of users 202 on the plurality of webpages of the one or more online platforms 102. At step 408, the user segmentation system 304 obtains the third set of data associated with the plurality of live events of the plurality of users 202 on the plurality of webpages of the one or more online platforms 102. At step 410, the user segmentation system 304 analyzes the first set of data, the second set of data, and the third set of data using the one or more machine learning algorithms. At step 412, the user segmentation system 304 creates the one or more segments of the plurality of users 202 based on the analysis performed on the first set of data, the second set of data and the third set of data using the plurality of filters. At step 414, the user segmentation system 304 triggers initialization of the one or more marketing campaigns for the one or more segments The flow chart 1800 terminates at step 416. It may be noted that the flowchart 1800 is explained to have above stated process steps; however, those skilled in the art would appreciate that the flowchart 1800 may have more/less number of process steps which may enable all the above stated embodiments of the present disclosure.

FIG. 19 illustrates the block diagram of a computing device 1900, in accordance with various embodiments of the present disclosure. The computing device 1900 includes a bus 502 that directly or indirectly couples the following devices: memory 504, one or more processors 506, one or more presentation components 508, one or more input/output (I/O) ports 510, one or more input/output components 512, and an illustrative power supply 514. The bus 502 represents what may be one or more busses (such as an address bus, data bus, or combination thereof). Although the various blocks of FIG. 19 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 19 is merely illustrative of an exemplary computing device 1900 that can be used in connection with one or more embodiments of the present invention. Distinction is not made between such categories as "workstation," "server," "laptop," "hand-held device," etc., as all are contemplated within the scope of FIG. 19 and reference to "computing device."

The computing device 1900 typically includes a variety of computer-readable media. The computer-readable media can be any available media that can be accessed by the computing device 1900 and includes both volatile and nonvolatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data.

The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 1900. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. The memory 504 may be removable, non-removable, or a combination thereof. Exemplary hardware devices include solid-state memory, hard drives, optical-disc drives, etc. The computing device 1900 includes one or more processors that read data from various entities such as memory 504 or I/O components 512. The one or more presentation components 508 present data indications to a user or other device. Exemplary presentation components include a display device, speaker, printing component, vibrating component, etc. The one or more I/O ports 510 allow the computing device 1900 to be logically coupled to other devices including the one or more I/O components 512, some of which may be built in. Illustrative components include a microphone, joystick, game pad, satellite dish, scanner, printer, wireless device, etc.

The present disclosure has numerous advantages over the prior art. The present disclosure provides a method and system to enable tracking of actions of the plurality of users. The disclosure provides the method and system to enable analyzing of actions of the plurality of users on the one or more online platforms. The disclosure provides the method and system to enable segmentation of the plurality of users based on the actions. The disclosure provides the method and system to enable running of the targeted marketing campaigns for the one or more segments of the plurality of users based on the actions. The disclosure provides the method and system to enable analysis of each of the one or more marketing campaigns to understand the real-time impact on user engagement.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed:

1. A computer-implemented method for granular level segmentation of users based on activities on webpages in real-time, the computer-implemented method comprising:
  receiving, at a user segmentation system with a processor, a first set of data associated with a plurality of users in the real time, wherein the plurality of users is associated with one or more communication devices, wherein the first set of data corresponds to personal information of the plurality of users, wherein the first set of data comprises name data, age data, e-mail identity data, contact number data, gender data, geographic location data, angiographic data, demographic data, payment cards data, banking partners data, and relationship status data, and wherein the first set of data is received from one or more online platform database, one or more communication device databases, and a third party database;
  fetching, at the user segmentation system with the processor, a second set of data associated with a plurality of past events of the plurality of users on at least one webpage of a plurality of webpages of one or more online platforms through the one or more communication devices;
  obtaining, at the user segmentation system with the processor, a third set of data associated with a plurality of live events of the plurality of users on the at least one webpage of the plurality of webpages of the one or more online platforms through the one or more communication devices, wherein the third set of data is obtained in the real-time;
  analyzing, at the user segmentation system with the processor, the first set of data, the second set of data, and the third set of data in real-time using one or more machine learning models, wherein the analysis is performed based on training of the one or more machine learning models, and wherein the one or more machine learning models is trained using one or more of a supervised machine learning model, and an unsupervised machine learning model;
  identifying, at the user segmentation system with the processor, using the one or more machine learning models, a match of one or more patterns of each of the plurality of users on a granular level based on the analysis performed on the first set of data, the second set of data and the third set of data, wherein the match of the one or more patterns is a match between a user pattern of each of the plurality of users among the first set of data, the second set of data and the third set of data;
  predicting, at the user segmentation system with the processor, a behavior of each of the plurality of users based on the identified match of the one or more patterns, the second set of data, and the third set of data, wherein the behavior of each of the plurality of users is predicted in the real-time;
  selecting, in the real time at the user segmentation system with the processor, a plurality of filters from a webpage category based on the predicted behavior of each of the plurality of users and one or more parameters, wherein the plurality of filters comprises time based filters, days based filters, age based filters, location based filters, events based filters, inactivity based filters, user properties filters, demographic filters, geographic filters, technographic filters, and application field filters, and wherein the one or more parameters comprise day, time, language, location, events, inactivity, and online platform;
  creating, at the user segmentation system with the processor one or more segments of the plurality of users based on the selected plurality of filters, wherein the one or more segments are created in the real-time;
  triggering, at the user segmentation system with the processor, initialization of one or more marketing campaigns for the created one or more segments, wherein the one or more marketing campaigns are initiated based on the match of the one or more patterns with the created one or more segments using the selected plurality of filters, wherein the one or more marketing campaigns are initiated in the real-time; and displaying, at the user segmentation system with the processor upon initialization of the one or more marketing campaigns for the one or more segments, one or more advertisements associated with the one or more marketing campaigns for the one or more segments, wherein the one or more advertisements are displayed to each of the plurality of users on a corresponding communication device of the one or more communication devices based on the match of the one or more patterns, wherein the one or more advertisements are displayed in the real-time on the one or more communication devices.

2. The computer-implemented method as recited in claim 1, wherein the second set of data corresponds the plurality of past events of the plurality of users, wherein the plurality of past events comprises past uniform resource locater visits, past number of visits, past number of pages accessed, past webpage visited, past accessed content, past started content, past paused content, past resumed content, past searched content, past notification clicks, past notification views, past products surfed, past products added to cart, past reviews for products, past favorite product category, past inactivity for products, past accounts opened, past credit card requests, past credit cards issued, past loan requests, past net-banking requests, past multimedia content surfed, past multimedia content watched, past texts exchanged, past business blogs, past live media streamed, past audio-video callings, past medicines searched, past medicines bought, past medical test kit bought, past medical tests scheduled, past bill payments, past doctor consultation scheduled, past hospital visit planned, past dietary plan requested, past personal trainer hired, past fitness center searched, past educational video searched, past educational video watched, past projects submitted, past mock tests subscribed, past educational counselling requested, past problem solving session requested, past international masters interests, past properties searched, past properties watched, past properties bought, past rented properties searched, past maintenance services requested, past hotel searched, past hotels added to watch-list, past hotel bookings, past holiday plans searched, past holiday plans booked, past stock exchange investments, past money donated, past inactivity for product category, past account created, past products bought, past repeated products, past subscriptions, past subscription renewals, past subscription skipped, past initiated transactions, past failed transactions, past content added to cart, past completed transactions, past most visited category, past content details watched, past video on demand accessed, past video on demand initiated, and past video on demand searched.

3. The computer-implemented method as recited in claim 1, wherein the third set of data corresponds the plurality of live events of the plurality of users, wherein the plurality of live events comprises real-time uniform resource locater visits, real-time number of webpage visits, real-time number of webpages accessed, real-time webpage visit, real-time accessed content, real-time started content, real-time paused content, real-time resumed content, real-time searched content, real-time notification clicks, real-time notification views, real-time products surfed, real-time products added to cart, real-time reviews for products, real-time favorite product category, real-time inactivity for products, real-time accounts opened, real-time credit card requests, real-time credit cards issued, real-time loan requests, real-time net-banking requests, real-time multimedia content surfed, real-time multimedia content watched, real-time texts exchanged, real-time business blogs, real-time live media streamed, real-time audio-video callings, real-time medicines searched, real-time medicines bought, real-time medical test kit bought, real-time medical tests scheduled, real-time bill payments, real-time doctor consultation scheduled, real-time hospital visit planned, real-time dietary plan requested, real-time personal trainer hired, real-time fitness center searched, real-time educational video searched, real-time educational video watched, real-time projects submitted, real-time mock tests subscribed, real-time educational counselling requested, real-time problem solving session requested, real-time international masters interests, real-time properties searched, real-time properties watched, real-time properties bought, real-time rented properties searched, real-time maintenance services requested, real-time hotel searched, real-time hotels added to watch-list, real-time hotel bookings, real-time holiday plans searched, real-time holiday plans booked, real-time stock exchange investments, real-time money donated, real-time inactivity for product category, real-time account created, real-time products bought, real-time repeated products, real-time subscriptions, real-time subscription renewals, real-time subscription skipped, real-time initiated transactions, real-time failed transactions, real-time content added to cart, real-time completed transactions, real-time most visited category, real-time content details watched, real-time video on demand accessed, real-time video on demand initiated, and real-time video on demand searched.

4. The computer-implemented method as recited in claim 1, further comprising creating, at the user segmentation system with the processor, the one or more machine learning models to perform the analysis of the first set of data, the second set of data, and the third set of data.

5. The computer-implemented method as recited in claim 1, wherein the one or more patterns comprise uniform resource locater visit pattern, webpage visit pattern, number of webpage accessed pattern, accessed content pattern, started content pattern, paused content pattern, resumed content pattern, searched content pattern, notification click pattern, notification views pattern, products surfed pattern, products added to cart pattern, reviews for products pattern, favorite product category pattern, inactivity for products pattern, accounts opened pattern, credit card requests pattern, credit cards issued pattern, loan request patterns, net-banking requests pattern, multimedia content surfed pattern, multimedia content watched pattern, texts exchanged pattern, business blogs pattern, live media streamed pattern, audio-video calling pattern, medicines searched pattern, medicines bought pattern, medical test kit bought pattern, medical tests scheduled pattern, bill payments pattern, doctor consultation scheduled pattern, hospital visit pattern, dietary plan request pattern, personal trainer hired pattern, fitness center search pattern, educational video search pattern, educational video watched pattern, projects submission pattern, mock tests subscription pattern, educational counselling request pattern, problem solving session request pattern, international masters interests pattern, properties search pattern, properties watched pattern, properties bought pattern, rented properties search pattern, maintenance services request pattern, hotel search pattern, hotels added to watch-list pattern, hotel bookings pattern, holiday plans search pattern, holiday plans booked pattern, stock exchange investments pattern, money donated pattern, inactivity for product category pattern, account creation pattern, products bought pattern, repeated products pattern, subscriptions pattern, subscription renewals pattern, subscription skipped pattern, initiated transactions pattern, failed transactions pattern, content added to cart pattern, completed transactions pattern, most visited category pattern, content details watched pattern, video on demand accessed pattern, video on demand initiated pattern, and video on demand searched pattern.

6. The computer-implemented method as recited in claim 1, further comprising creating, at the user segmentation system with the processor, a segment plot for each of the one or more segments, the segment plot is in one or more forms, wherein the one or more forms comprise bar graph, histogram, pictogram, pie graph, line graph, and, cartesian graph, wherein the segment plot is downloaded in one or more formats, wherein the one or more formats comprise chart, joint photographic experts group, portable network graphics, portable document format, scalable vector graphics, and comma-separated values.

7. A computer system comprising:
one or more processors; and
a memory coupled to the one or more processors, the memory for storing instructions which, when executed by the one or more processors, cause the one or more processors to perform a method for granular level segmentation of users based on activities on webpages in real-time, the method comprising:
receiving, at a user segmentation system, a first set of data associated with a plurality of users in the real time, wherein the plurality of users is associated with one or more communication devices, wherein the first set of data corresponds to personal information of the plurality of users, wherein the first set of data comprises name data, age data, e-mail identity data, contact number data, gender data, geographic location data, angiographic data, demographic data, payment cards data, banking partners data, and relationship status data, and wherein the first set of data is received from one or more online platform databases, one or more communication device databases, and a third party database;
fetching, at the user segmentation system, a second set of data associated with a plurality of past events of the plurality of users on at least one webpage of a plurality of webpages of one or more online platforms through the one or more communication devices;
obtaining, at the user segmentation system, a third set of data associated with a plurality of live events of the plurality of users on the at least one webpage of the plurality of webpages of the one or more online platforms through the one or more communication devices, wherein the third set of data is obtained in the real-time;
analyzing, at the user segmentation system, the first set of data, the second set of data and the third set of data in real-time using one or more machine learning models, wherein the analysis is performed based on training of the one or more machine learning models, and wherein the one or more machine learning models is trained using one or more of a supervised machine learning model, and an unsupervised machine learning model;
identifying, at the user segmentation system with the processor, using the one or more machine learning models, a match of one or more patterns of each of the plurality of users on a granular level based on the analysis performed on the first set of data, the second set of data and the third set of data, wherein the match of the one or more patterns is a match between a user pattern of each of the plurality of users among the first set of data, the second set of data and the third set of data;
predicting, at the user segmentation system, a behavior of each of the plurality of users based on the identified match of the one or more patterns, the second set of data, and the third set of data, wherein the behavior of each of the plurality of users is predicted in the real-time;
selecting, in the real time at the user segmentation system, a plurality of filters from a webpage category based on the predicted behavior of each of the plurality of users and one or more parameters, wherein the plurality of filters comprises time based filters, days based filters, age based filters, location based filters, events based filters, inactivity based filters, user properties filters, demographic filters, geographic filters, technographic filters, and application field filters, and wherein the one or more parameters comprise day, time, language, location, events, inactivity, and online platform;
creating, at the user segmentation system, one or more segments of the plurality of users based on selected plurality of filters, wherein the one or more segments are created in the real-time;
triggering, at the user segmentation system, initialization of one or more marketing campaigns for the created one or more segments, wherein the one or more marketing campaigns are initiated based on the match of the one or more patterns with the created one or more segments using the selected plurality of filters, wherein the one or more marketing campaigns are initiated in the real-time; and
displaying, at the user segmentation system upon initialization of the one or more marketing campaigns for the one or more segments, one or more advertisements associated with the one or more marketing campaigns for the one or more segments, wherein the one or more advertisements are displayed to each of the plurality of users on a corresponding communication device of the one or more communication devices based on the match of the one or more patterns, wherein the one or more advertisements are displayed in the real-time on the one or more communication devices.

8. The computer system as recited in claim 7, wherein the second set of data corresponds the plurality of past events of the plurality of users, wherein the plurality of past events comprises past uniform resource locater visits, past number of visits, past number of pages accessed, past webpage visited, past accessed content, past started content, past paused content, past resumed content, past searched content, past notification clicks, past notification views, past products surfed, past products added to cart, past reviews for products, past favorite product category, past inactivity for products, past accounts opened, past credit card requests, past credit cards issued, past loan requests, past net-banking requests, past multimedia content surfed, past multimedia content watched, past texts exchanged, past business blogs, past live media streamed, past audio-video callings, past medicines searched, past medicines bought, past medical test kit bought, past medical tests scheduled, past bill payments, past doctor consultation scheduled, past hospital visit planned, past dietary plan requested, past personal trainer hired, past fitness center searched, past educational video searched, past educational video watched, past projects submitted, past mock tests subscribed, past educational counselling requested, past problem solving session requested, past international masters interests, past properties searched, past properties watched, past properties bought, past rented properties searched, past maintenance services requested, past hotel searched, past hotels added to watch-list, past hotel bookings, past holiday plans searched, past holiday plans booked, past stock exchange investments, past money donated, past inactivity for product category, past account created, past products bought, past repeated products, past subscriptions, past subscription renewals, past subscription skipped, past initiated transactions, past failed transactions, past content added to cart, past completed transactions, past most visited category, past content details watched, past video on demand accessed, past video on demand initiated, and past video on demand searched.

9. The computer system as recited in claim 7, wherein the third set of data corresponds the plurality of live events of the plurality of users, wherein the plurality of live events comprises real-time uniform resource locater visits, real-time number of webpage visits, real-time number of webpages accessed, real-time webpage visit, real-time accessed content, real-time started content, real-time paused content, real-time resumed content, real-time searched content, real-time notification clicks, real-time notification views, real-time products surfed, real-time products added to cart, real-time reviews for products, real-time favorite product category, real-time inactivity for products, real-time accounts opened, real-time credit card requests, real-time credit cards issued, real-time loan requests, real-time net-banking requests, real-time multimedia content surfed, real-time multimedia content watched, real-time texts exchanged, real-time business blogs, real-time live media streamed, real-time audio-video callings, real-time medicines searched, real-time medicines bought, real-time medical test kit bought, real-time medical tests scheduled, real-time bill payments, real-time doctor consultation scheduled, real-time hospital visit planned, real-time dietary plan requested, real-time personal trainer hired, real-time fitness center searched, real-time educational video searched, real-time educational video watched, real-time projects submitted, real-time mock tests subscribed, real-time educational counselling requested, real-time problem solving session requested, real-time international masters interests, real-time properties searched, real-time properties watched, real-time properties bought, real-time rented properties searched, real-time maintenance services requested, real-time hotel searched, real-time hotels added to watch-list, real-time hotel bookings, real-time holiday plans searched, real-time holiday plans booked, real-time stock exchange investments, real-time money donated, real-time inactivity for product category, real-time account created, real-time products bought, real-time repeated products, real-time subscriptions, real-time subscription renewals, real-time subscription skipped, real-time initiated transactions, real-time failed transactions, real-time content added to cart, real-time completed transactions, real-time most visited category, real-time content details watched, real-time video on demand accessed, real-time video on demand initiated, and real-time video on demand searched.

10. The computer system as recited in claim 7, further comprising creating, at the user segmentation system, the one or more machine learning models to perform the analysis of the first set of data, the second set of data, and the third set of data.

11. The computer system as recited in claim 7, wherein the one or more patterns comprise uniform resource locater visit pattern, webpage visit pattern, number of webpage accessed pattern, accessed content pattern, started content pattern, paused content pattern, resumed content pattern, searched content pattern, notification click pattern, notification views pattern, products surfed pattern, products added to cart pattern, reviews for products pattern, favorite product category pattern, inactivity for products pattern, accounts opened pattern, credit card requests pattern, credit cards issued pattern, loan request patterns, net-banking requests pattern, multimedia content surfed pattern, multimedia content watched pattern, texts exchanged pattern, business blogs pattern, live media streamed pattern, audio-video calling pattern, medicines searched pattern, medicines bought pattern, medical test kit bought pattern, medical tests scheduled pattern, bill payments pattern, doctor consultation scheduled pattern, hospital visit pattern, dietary plan request pattern, personal trainer hired pattern, fitness center search pattern, educational video search pattern, educational video watched pattern, projects submission pattern, mock tests subscription pattern, educational counselling request pattern, problem solving session request pattern, international masters interests pattern, properties search pattern, properties watched pattern, properties bought pattern, rented properties search pattern, maintenance services request pattern, hotel search pattern, hotels added to watch-list pattern, hotel bookings pattern, holiday plans search pattern, holiday plans booked pattern, stock exchange investments pattern, money donated pattern, inactivity for product category pattern, account creation pattern, products bought pattern, repeated products pattern, subscriptions pattern, subscription renewals pattern, subscription skipped pattern, initiated transactions pattern, failed transactions pattern, content added to cart pattern, completed transactions pattern, most visited category pattern, content details watched pattern, video on demand accessed pattern, video on demand initiated pattern, and video on demand searched pattern.

12. The computer system as recited in claim 7, further comprising creating, at the user segmentation system, a segment plot for each of the one or more segments, the segment plot is in one or more forms, wherein the one or more forms comprise bar graph, histogram, pictogram, pie graph, line graph, and, cartesian graph, wherein the segment plot is downloaded in one or more formats, wherein the one or more formats comprise chart, joint photographic experts group, portable network graphics, portable document format, scalable vector graphics, and comma-separated values.

13. A non-transitory computer-readable storage medium encoding computer executable instructions that, when executed by at least one processor, performs a method for granular level segmentation of users based on online activities on a webpage in real-time, the method comprising:

receiving, at a computing device, a first set of data associated with a plurality of users in the real time, wherein the plurality of users is associated with one or more communication devices, wherein the first set of data corresponds to personal information of the plurality of users, wherein the first set of data comprises name data, age data, e-mail identity data, contact number data, gender data, geographic location data, angiographic data, demographic data, payment cards data, banking partners data, and relationship status data, and wherein the first set of data is received from one or more online platform database, one or more communication device database, and a third party database;

fetching, at the computing device, a second set of data associated with a plurality of past events of the plurality of users on at least one webpage of a plurality of webpages of one or more online platforms through the one or more communication devices;

obtaining, at the computing device, a third set of data associated with a plurality of live events of the plurality of users on the at least one webpage of the plurality of webpages of the one or more online platforms through the one or more communication devices, wherein the third set of data is obtained in the real-time;

analyzing, at the computing device, the first set of data, the second set of data and the third set of data in real-time using one or more machine learning models, wherein the analysis is performed based on training of the one or more machine learning models, and wherein the one or more machine learning models is trained using one or more of a supervised machine learning model, and an unsupervised machine learning model;

identifying, at the computing device, using the one or more machine learning models, a match of one or more patterns of each of the plurality of users on a granular level based on the analysis performed on the first set of data, the second set of data and the third set of data, wherein the match of the one or more patterns is a match between a user pattern of each of the plurality of users among the first set of data, the second set of data and the third set of data;

predicting, at the computing device, a behavior of each of the plurality of users based on the identified match of the one or more patterns, the second set of data, and the third set of data, wherein the behavior of each of the plurality of users is predicted in the real-time;

selecting, in the real time at the computing device, a plurality of filters from a webpage category based on the predicted behavior of each of the plurality of users and one or more parameters, wherein the plurality of filters comprises time based filters, days based filters, age based filters, location based filters, events based filters, inactivity based filters, user properties filters, demographic filters, geographic filters, technographic filters, and application field filters, and wherein the one or more parameters comprise day, time, language, location, events, inactivity, and online platform;

creating, at the computing device, one or more segments of the plurality of users based on the selected plurality of filters, wherein the one or more segments are created in the real-time;

triggering, at the computing device, initialization of one or more marketing campaigns for the created one or more segments, wherein the one or more marketing campaigns are initiated based on the match of the one or more patterns with the created one or more segments using the selected plurality of filters, wherein the one or more marketing campaigns are initiated in the real-time;

controlling, upon the initialization of the one or more marketing campaigns for the one or more segments, the one or more communication devices to display one or more advertisements associated with the one or more marketing campaigns for the one or more segments, wherein the one or more advertisements are displayed to each of the plurality of users on a corresponding communication device of the one or more communication devices based on the match of the one or more patterns, wherein the one or more advertisements are displayed in the real-time on the one or more communication devices; and further comprising creating, at the computing device, a segment plot for each of the one or more segments, the segment plot is in one or more forms, wherein the one or more forms comprise bar graph, histogram, pictogram, pie graph, line graph, and, cartesian graph, wherein the segment plot is downloaded in one or more formats, wherein the one or more formats comprise chart, joint photographic experts group, portable network graphics, portable document format, scalable vector graphics, And comma-separated values.

* * * * *